(12) United States Patent
Seto

(10) Patent No.: US 11,729,326 B2
(45) Date of Patent: Aug. 15, 2023

(54) IMAGE FORMING APPARATUS AND CONTROL METHOD

(71) Applicant: SHARP KABUSHIKI KAISHA, Sakai (JP)

(72) Inventor: Hideki Seto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/685,979

(22) Filed: Mar. 3, 2022

(65) Prior Publication Data

US 2022/0294919 A1    Sep. 15, 2022

(30) Foreign Application Priority Data

Mar. 9, 2021 (JP) ................................ 2021-037445

(51) Int. Cl.
*H04N 1/00* (2006.01)
(52) U.S. Cl.
CPC ..... *H04N 1/00506* (2013.01); *H04N 1/00408* (2013.01); *H04N 1/00477* (2013.01); *H04N 1/00514* (2013.01)

(58) Field of Classification Search
CPC .......... H04N 1/00506; H04N 1/00408; H04N 1/00477; H04N 1/00514
See application file for complete search history.

(56) References Cited

U.S. PATENT DOCUMENTS

| 2012/0252536 | A1* | 10/2012 | Noda | H04M 1/724 |
| | | | | 455/566 |
| 2017/0300194 | A1* | 10/2017 | Lee | G06F 3/04817 |
| 2020/0028982 | A1* | 1/2020 | Tose | G06F 3/1256 |
| 2020/0125307 | A1* | 4/2020 | Kitayama | H04N 1/00015 |
| 2020/0327868 | A1* | 10/2020 | Ezaki | B60K 35/00 |
| 2021/0183336 | A1* | 6/2021 | Hassan | G09G 5/14 |
| 2021/0195049 | A1* | 6/2021 | Ikawa | G06F 8/65 |

FOREIGN PATENT DOCUMENTS

JP    2014-041526 A    3/2014

\* cited by examiner

*Primary Examiner* — Iriana Cruz
(74) *Attorney, Agent, or Firm* — ScienBiziP, P.C.

(57) ABSTRACT

An image forming apparatus includes a displayer that displays a display screen corresponding to a mode, an obtainer that obtains content of a notification corresponding to the mode, and a controller that controls display of the content of the notification that is obtained together with display content of the mode, on the display screen.

8 Claims, 21 Drawing Sheets

FIG. 3

| NAME | DISPLAY FLAG |
|---|---|
| SIMPLE COPY | Yes |
| SIMPLE FAX | Yes |
| SIMPLE SCAN | Yes |
| SIMPLE RELEASE | Yes |
| COPY | – |
| FAX | – |
| SCAN | – |
| SETTING HISTORY | Yes |
| SHARED FOLDER | Yes |
| CLOUD DRIVE | Yes |
| SCAN SAVE | Yes |
| ADDRESS BOOK | Yes |
| INSTRUCTION MANUAL | – |
| ⋮ | ⋮ |

FIG. 4

| CONTENT OF NOTIFICATION | CORRESPONDING OPERATION MODE |
|---|---|
| APPLICATION UPDATE IS AVAILABLE. | – |
| RETENTION DATA IS AVAILABLE. | SIMPLE COPY |
| [C] TONER IS LOW. | – |
| FAX HAS ARRIVED. | – |
| FIRMWARE UPDATE IS AVAILABLE. | – |
| ⋮ | ⋮ |

D100

| TYPE OF NOTIFICATION | DISPLAY LEVEL |
| --- | --- |
| NOTIFICATION THAT THERE IS NO RETENTION DATA | DISPLAY (HIGHLIGHTED) |
| NOTIFICATION OF LOW TONER | DISPLAY |
| NOTIFICATION OF OUT OF TONER | DISPLAY |
| NOTIFICATION OF OUT OF PAPER | DISPLAY (HIGHLIGHTED) |
| NOTIFICATION OF FAX RECEPTION | DISPLAY (HIGHLIGHTED) |
| NOTIFICATION OF LATEST VERSION OF FIRMWARE APPLICATION | NO DISPLAY |
| ⋮ | ⋮ |

| CONTENT OF NOTIFICATION | CORRESPONDING OPERATION MODE | TYPE | PRIORITY |
|---|---|---|---|
| RETENTION DATA IS AVAILABLE. | SIMPLE COPY | INFORMATION | 20 |
| THE FOLLOWING TONERS ARE LOW. C: CYAN, M: MAGENTA | SIMPLE COPY | INFORMATION | 10 |
| THE NETWORK IS NOT CONNECTED. CHECK YOUR Wi-Fi SETTINGS. | – | ERROR | 1 |
| THE SETTINGS AND SCREENS CAN BE CHANGED FOR EACH USER. (QUICK AUTHENTICATION) | – | GUIDANCE | 99 |
| ⋮ | ⋮ | ⋮ | ⋮ |

FIG. 14

| LOGIN NAME | PASSWORD | USER NAME | USER TYPE |
|---|---|---|---|
| userA | abc123 | John Smith | GENERAL USER |
| admin01 | adminae2fj | Joe Bloggs | ADMINISTRATOR |
| admin02 | admin2p92a | Fred Bloggs | ADMINISTRATOR |
| ⋮ | ⋮ | ⋮ | ⋮ |

FIG. 15

| CONTENT OF NOTIFICATION | CORRESPONDING OPERATION MODE | TARGET USER |
|---|---|---|
| APPLICATION UPDATE IS AVAILABLE. | - | ADMINISTRATOR |
| RETENTION DATA IS AVAILABLE. | SIMPLE COPY | GENERAL USER |
| [C] TONER IS LOW. | - | ADMINISTRATOR |
| FAX HAS ARRIVED. | - | userA |
| FIRMWARE UPDATE IS AVAILABLE. | - | ADMINISTRATOR |
| ⋮ | ⋮ | ⋮ |

IMAGE FORMING APPARATUS AND CONTROL METHOD

CROSS-REFERENCE TO RELATED APPLICATION

The present application claims priority from Japanese Patent Application No. 2021-037445 content to which is hereby incorporated by reference into this application.

BACKGROUND OF THE INVENTION

1. Field of the Invention

The present disclosure relates to an image forming apparatus and the like.

2. Description of the Related Art

Conventionally, image forming apparatuses such as multifunction peripherals and printers that output images using an electrophotographic method have been used. A technique for displaying information about an image forming apparatus has also been proposed.

For example, an information processing apparatus has been proposed in which when notification information transmitted from an external apparatus is received, a UI mode displayed on the screen of a specific displayer is identified, and a first UI mode is identified, the notification information is displayed on the display screen by the first UI mode, and when a second UI mode is identified, the notification information is displayed on the display screen by the second UI mode (see, for example, Japanese Unexamined Patent Application Publication No. 2014-41526).

SUMMARY OF THE INVENTION

When a notification is displayed on the operation screen of an image forming apparatus, an unnecessary notification is displayed to the user when a notification that is not related to the status of the image forming apparatus is made. This is thought to impair the convenience of the image forming apparatus. Therefore, it is necessary to control the display of the content of the notification in accordance with the display content of the operation screen. However, Japanese Unexamined Patent Application Publication No. 2014-41526 does not consider such control.

In view of the above-mentioned issues, it is an object of the present disclosure to provide an image forming apparatus or the like capable of displaying a notification in accordance with a display content.

An image forming apparatus according to the present disclosure includes a displayer that displays a display screen corresponding to a mode, an obtainer that obtains content of a notification corresponding to the mode, and a controller that controls display of the content of the notification that is obtained together with display content of the mode, on the display screen.

In addition, a control method according to the present disclosure is a method for an image forming apparatus including a displayer that displays a display screen corresponding to a mode, and includes obtaining content of a notification corresponding to the mode, and controlling display of the content of the notification that is obtained together with display content of the mode, on the display screen.

According to the present disclosure, it is possible to display a notification in accordance with the display content.

BRIEF DESCRIPTION OF THE DRAWINGS

FIG. 3 is a table for explaining an example of home screen information in the first embodiment.

FIG. 4 is a table for explaining an example of a data structure of notification information in the first embodiment.

FIG. 14 is a table for explaining an example of a data structure of user information in the second embodiment.

FIG. 15 is a table for explaining an example of a data structure of notification information in the second embodiment.

DETAILED DESCRIPTION OF THE INVENTION

Embodiments for implementing the present disclosure will be described hereinafter with reference to the accompanying drawings. The following embodiments are examples for explaining the present disclosure, and the technical scope of the invention set forth in the claims is not limited to the following description.

1. First Embodiment

1.1 Functional Configuration

Figure 1:
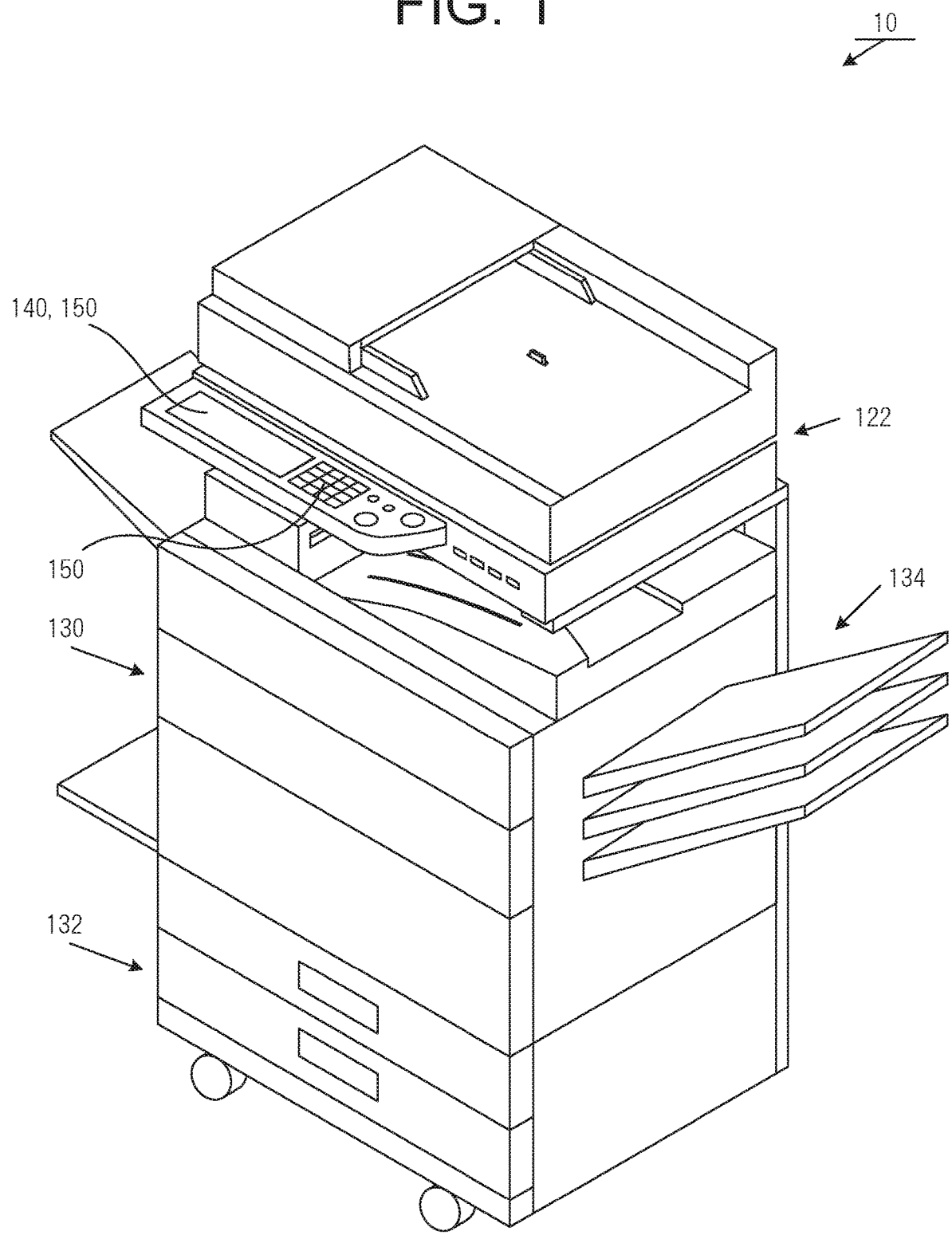
FIG. 1 is an external perspective view of an image forming apparatus in a first embodiment.
Figure 2:
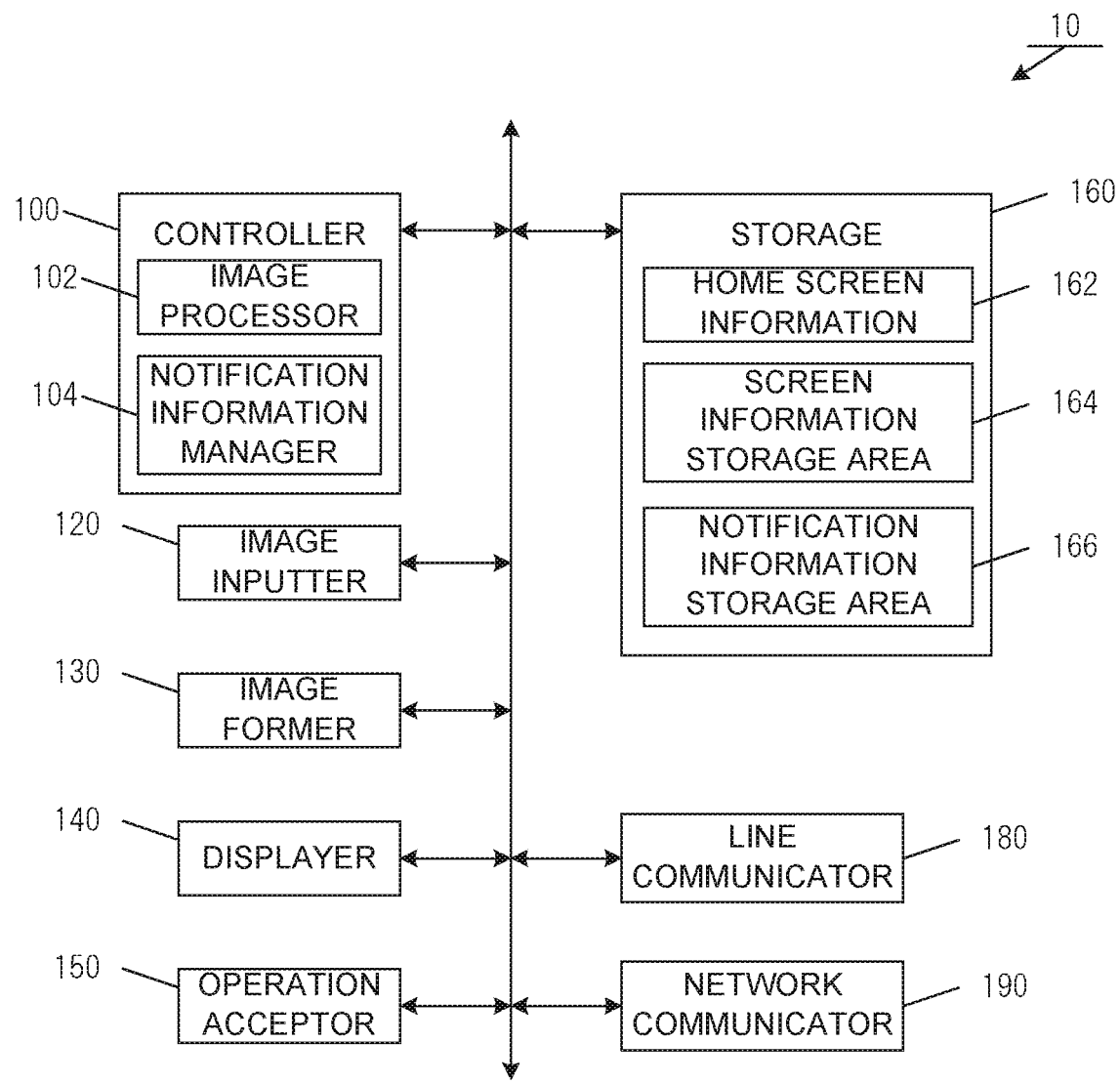
FIG. 2 is a diagram for explaining a functional configuration of the image forming apparatus in the first embodiment.

A first embodiment of the present invention will be described below with reference to the drawings. FIG. 1 is an external perspective view of an image forming apparatus 10 according to a first embodiment. FIG. 2 is a block diagram illustrating a functional configuration of the image forming apparatus 10.

The image forming apparatus 10 is a digital MFP (Multi-Function Peripheral/Printer) having functions such as copy, print, scanner, and e-mail. As illustrated in FIG. 2, the image forming apparatus 10 includes a controller 100, an image inputter 120, an image former 130, a displayer 140, an operation acceptor 150, a storage 160, a line communicator 180, and a network communicator 190.

The controller 100 is a functional part for controlling the image forming apparatus 10 as a whole. The controller 100 reads and executes various programs stored in the storage 160 to thereby implement various functions, and includes, for example, one or more computing devices (CPU (Central Processing Unit), etc.).

The image inputter 120 inputs image data to the image forming apparatus 10. For example, the image inputter 120 includes a scanner device or the like capable of reading images and generating image data. The scanner device converts an image into an electrical signal by, for example, an image sensor such as a CCD (Charge Coupled Device) and a CIS (Contact Image Sensor), and quantizes and encodes the electrical signal to thereby generate digital data. The image inputter 120 may include an interface (terminal) for reading image data stored in a storage medium such as a USB (Universal Serial Bus) memory or an SD card. The image inputter 120 may also input image data from the other device via the network communicator 190.

The image former 130 forms (prints) an image on a recording medium such as a recording paper. The image former 130 includes, for example, a printing device such as a laser printer using an electrophotographic method. The image former 130, for example, feeds a recording paper from a paper feed tray 132 in FIG. 1, forms an image on the surface of the recording paper, and discharges the recording paper from a paper discharge tray 134.

The displayer 140 displays various types of information. The displayer 140 includes a display device, such as an LCD (liquid crystal display), an organic EL (electro-luminescence) panel, or a micro LED (light emitting diode) display.

The operation acceptor 150 accepts operation instructions from the user of the image forming apparatus 10. The operation acceptor 150 includes input devices such as various key switches and touch sensors that detect input by contact (touch). A method of detecting an input in the touch sensor may be any general detection method such as a resistive method, an infrared method, an electromagnetic induction method, and an electrostatic capacitive method. The image forming apparatus 10 may include a touch panel in which the displayer 140 and the operation acceptor 150 are integrally formed.

The storage 160 stores various programs and various data necessary for the operation of the image forming apparatus 10. The storage 160 includes, for example, a storage device such as an SSD (Solid State Drive) which is a semiconductor memory, and an HDD (Hard Disk Drive).

The storage 160 stores home screen information 162. In addition, the storage 160 allocates a screen information storage area 164 and a notification information storage area 166 as storage areas.

The home screen information 162 is information that indicates the display content of a home screen. The home screen is a screen that allows the user to select a function provided by the image forming apparatus 10. The home screen information 162 is a table that stores, for example, a function provided by the image forming apparatus 10 (e.g., "simple copy") and a display flag (e.g., "Yes") indicating whether to display the button for using the function, as illustrated in FIG. 3. In this case, the content of the display flags stored in the table may be modified (customized) by the administrator or the like of the image forming apparatus 10. In addition, the layout, color scheme, and display elements of the home screen may be stored in the home screen information 162. Display elements are elements such as buttons, text, fields, and icons that are displayed on the screen.

The screen information storage area 164 is an area where information (screen information) indicating the display content of screens other than the home screen is stored. Screen information, for example, is information that maps the operation mode to the screen information (e.g., layout, color scheme, display elements, etc.) to be displayed in that operation mode. The operation mode is a state maintained inside the image forming apparatus 10 to operate a specific function among the functions provided by the image forming apparatus 10.

The screen information is stored in the image forming apparatus 10 in advance. In addition, the screen information may be modified (customized) by the administrator or the like of the image forming apparatus 10.

The notification information storage area 166 is an area where information about a notification (notification information) is stored. The notification in the present embodiment refers to information that indicates the state of the image forming apparatus 10, information necessary for management, and information that is reported to the user who uses the image forming apparatus 10.

As illustrated in FIG. 4, the notification information includes, for example, the content of the notification (e.g., "Retention data is available.") and a corresponding operation mode (e.g., "simple copy") indicating an operation mode related to the content of the notification.

The notification information may store content of notification that is not associated with a specific operation mode. The content of notification that is not associated with a specific operation mode is represented by notification information in which information of a specific operation mode is not stored for the corresponding operation mode, for example, as illustrated in D100 in FIG. 4.

The line communicator 180 communicates with external devices via public lines (e.g., general telephone lines). The line communicator 180 includes, for example, a terminal into which a cable that can be connected to a public line can be plugged.

The network communicator 190 communicates with external devices via a LAN (Local Area Network) and a WAN (Wide Area Network). The network communicator 190 includes, for example, a communication device and a communication module such as an NIC (Network Interface Card) used in a wired/wireless LAN.

In addition, the controller 100 functions as the image processor 102 and the notification information manager 104 by executing the program stored in the storage 160.

The image processor 102 performs various image related processing. For example, the image processor 102 executes sharpening processing and tone conversion processing on an image that is read by the image inputter 120.

The notification information manager 104 stores notification information in the notification information storage area 166 and deletes notification information stored in the notification information storage area 166, thereby managing the notification information.

For example, the notification information manager 104 monitors whether the image forming apparatus 10 is in a normal state. In addition, when the image forming apparatus 10 is not in a normal state, the notification information manager 104 stores notification information indicating that the image forming apparatus 10 is not in a normal state in the notification information storage area 166. When the image forming apparatus 10 returns to the normal state, the corresponding notification information is deleted from the notification information storage area 166.

The case where the image forming apparatus 10 is not in a normal state is, for example, the following.

- When the cover of the ADF (Auto Document Feeder) or the cover of the toner cartridge compartment is open
- When a paper jam occurs
- When paper is out
- When toner is out
- When there is a network failure In addition, the notification information manager 104 may store information based on the state of the image forming apparatus 10 in the notification information storage area 166 as notification information. The information based on the state of the image forming apparatus 10 is, for example, the following information.

- When the toner is almost out (toner near-empty)
- When the paper is almost out (near end of paper)
- When a facsimile is received Further, the notification information manager 104 may store information related to the usage status of the image forming apparatus 10 in the notification information storage area 166 as notification information. For example, the notification information manager 104 may store information such as an operation method of the image forming apparatus 10 and an introduction of a function provided in the image forming apparatus 10 in the notification information storage area 166 as notification information, from the start of use of the image forming apparatus 10 until a predetermined period of time elapses. Furthermore, the notification information manager 104 may store information such as the need to replace a component (for example, a photosensitive drum) of the image forming apparatus 10 in the notification information storage area 166 as notification information, after a predetermined period of time has passed since the image forming apparatus 10 was first used.

In addition, the notification information manager 104 receives the content of notification and the information of the operation mode corresponding to the content of the notification on the basis of the operation of the administrator or the like of the image forming apparatus 10, and may store the notification information based on the received information in the notification information storage area 166.

1.2 Flow of Processing

Figure 5:
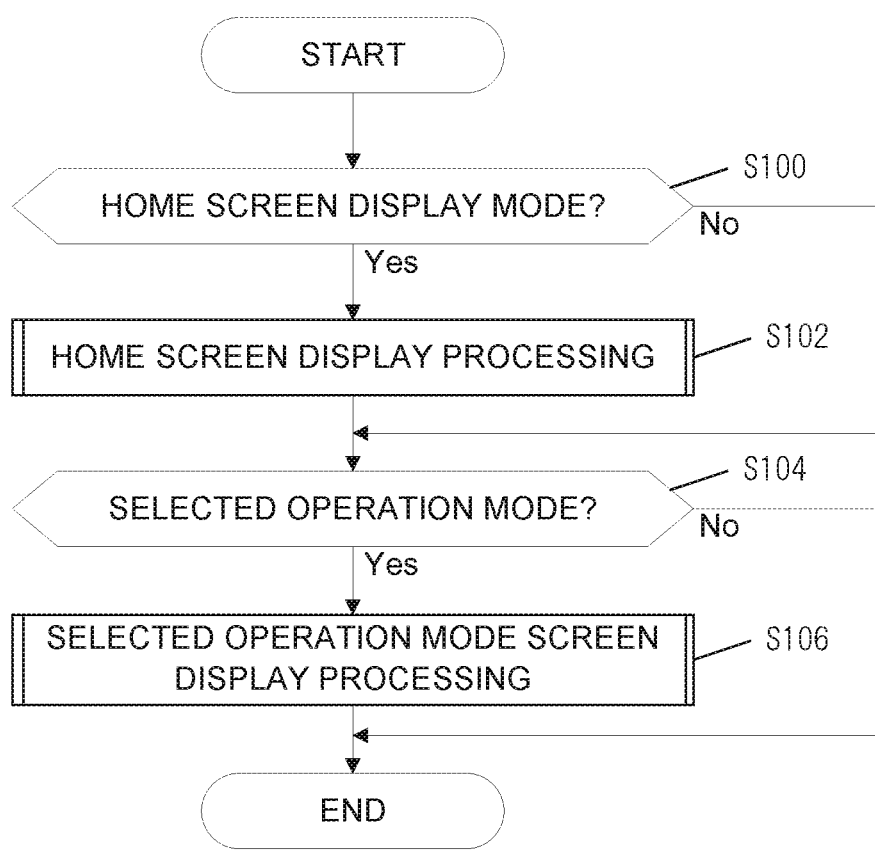
FIG. 5 is a flow diagram for explaining a flow of main processing by the image forming apparatus in the first embodiment.
Figure 6:
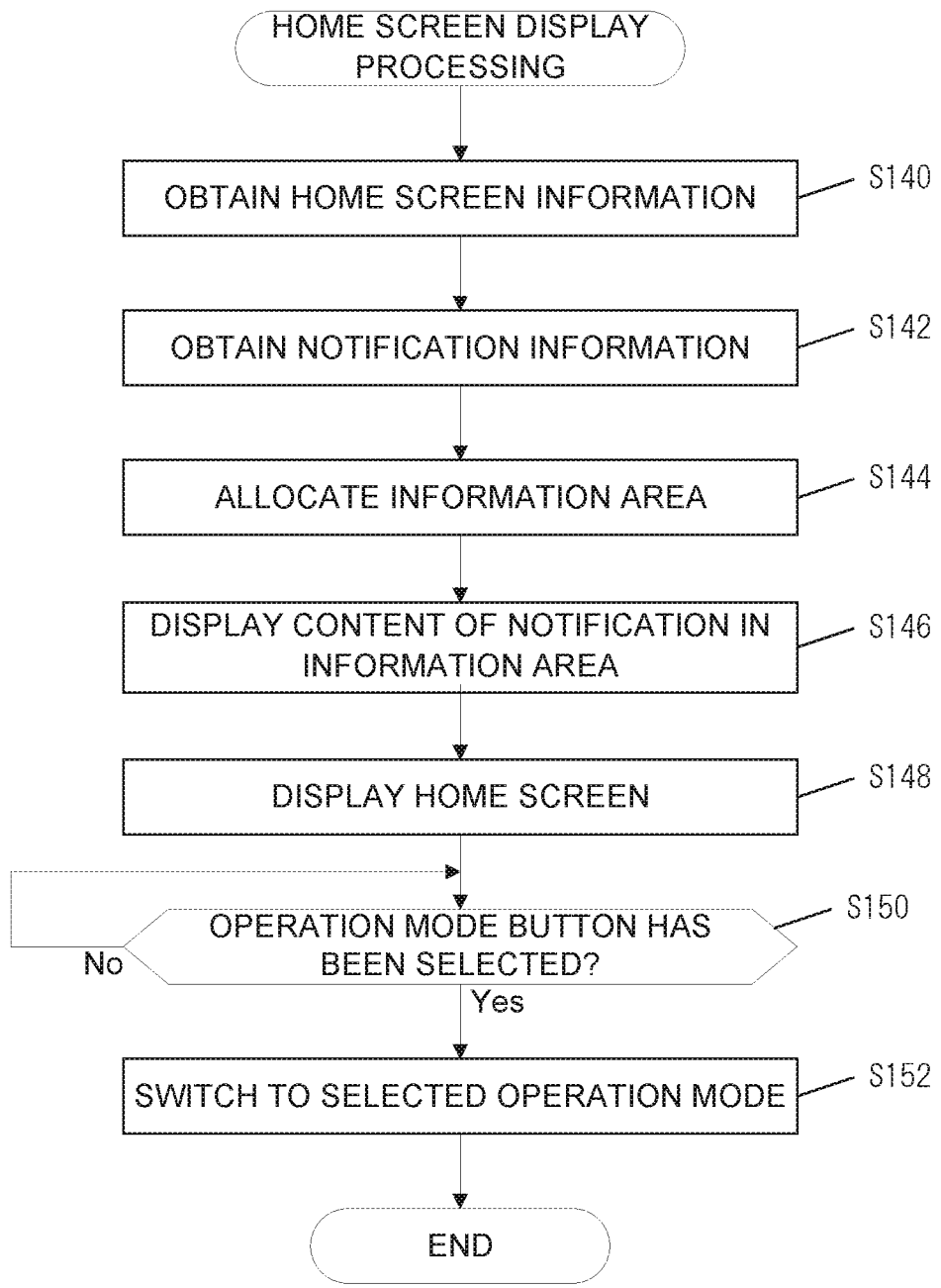
FIG. 6 is a flow diagram for explaining a flow of home screen display processing in the first embodiment.
Figure 7:
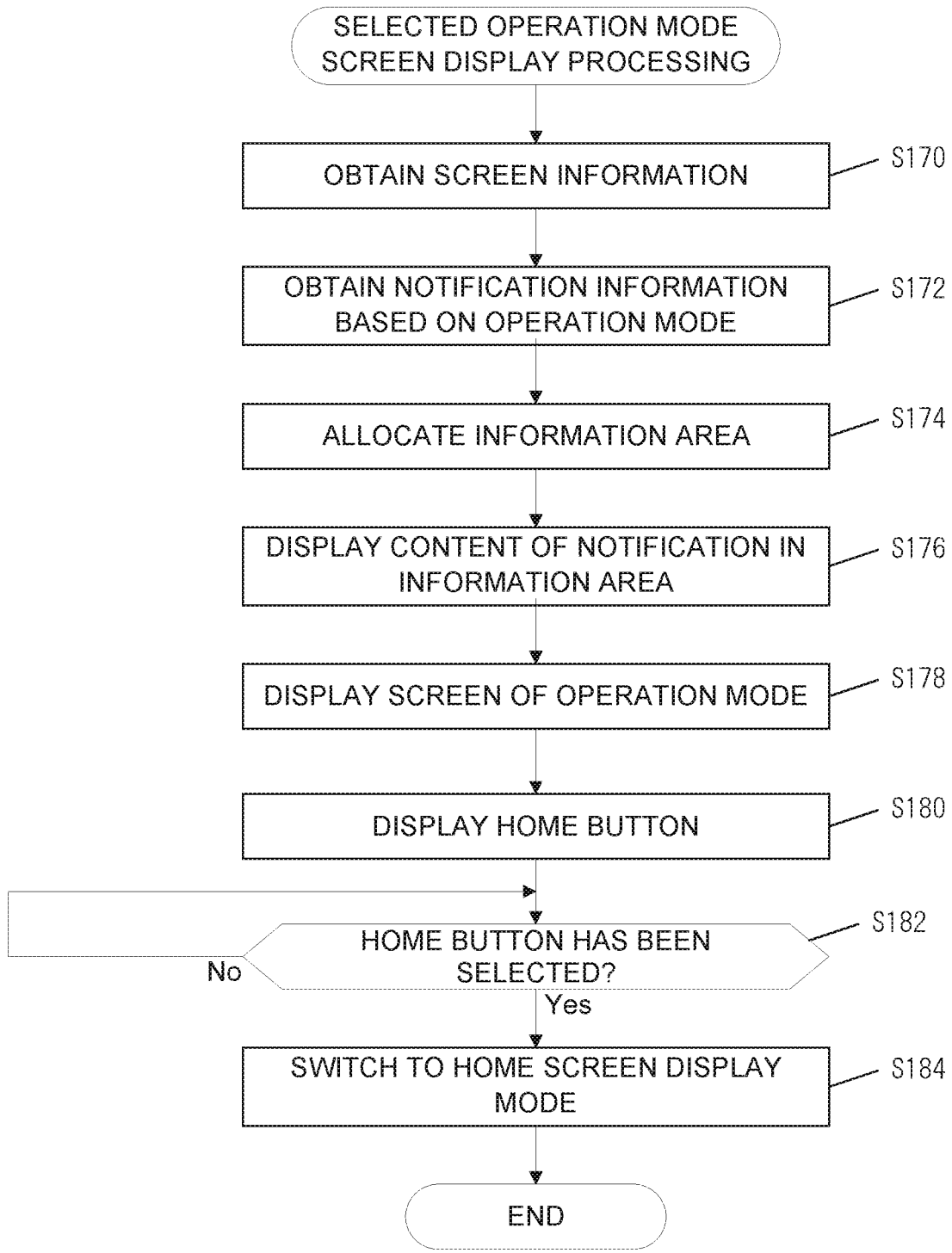
FIG. 7 is a flow diagram for explaining a flow of selected operation mode screen display processing in the first embodiment.

The main processing executed by the controller 100 of the image forming apparatus 10 in the present embodiment will be described with reference to FIGS. 5 to 7. The processing illustrated in FIGS. 5 to 7 are performed, for example, by the controller 100 reading a program stored in the storage 160.

In addition, the present embodiment is described assuming that when the power is turned on or when the image forming apparatus 10 returns from the sleep mode or low power mode, the controller 100 switches the operation mode to the home screen display mode which is the mode to display the home screen.

1.2.1 Main Processing

First, the main processing illustrated in FIG. 5 will be described. The main processing is the processing executed by the controller 100 when the operation mode is switched.

First, the controller 100 determines whether the operation mode of the image forming apparatus 10 is the home screen display mode (step S100). When determining that the operation mode is the home screen display mode, the controller 100 executes home screen display processing that displays the home screen on the displayer 140 (if Yes in step S100, then step S102). The home screen display processing will be described below.

On the other hand, when determining that the operation mode is not the home screen display mode, the controller 100 determines whether the operation mode is the selected operation mode which is the mode to operate a predetermined function (if No in step S100, then step S104).

The selected operation mode is the operation mode selected by the user via the home screen. The selected operation mode includes, for example, a copy mode to operate the copy function, a fax mode to transmit an image via the line communicator 180, and a scanner mode to transmit the image read via the image inputter 120 to another device, and the like.

When determining that the operation mode is the selected operation mode, the controller 100 executes selected operation mode screen display processing which is the processing to display a screen on which settings and the like for operating a function corresponding to the operation mode can be made (if Yes in step S104, then S106). The selected operation mode screen display processing will be described below.

When determining that the operation mode is not the selected operation mode, the controller 100 ends the main processing (No in step S104).

1.2.2 Home Screen Display Processing

The home screen display processing will be described with reference to FIG. 6. First, the controller 100 obtains the home screen information 162 from the storage 160 (step S140). Further, the controller 100 reads the notification information storage area 166 of the storage 160, thereby obtaining all the notification information stored in the notification information storage area 166 (step S142).

Then, the controller 100 allocates an information area in the display area of the displayer 140 (step S144). The information area is the area used to display the content of the notification contained in the notification information.

Here, since the operation mode is the home screen display mode to display the home screen, the controller 100 allocates the information area in accordance with the screen to be displayed on the home screen. For example, if the home screen includes an area to display a button (operation mode button) that is selected by the user to switch the operation mode, the controller 100 allocates a predetermined size area as the information area within the area to display the operation mode button. In this case, the information area allocated by the controller 100 may have a size according to the number of pieces of notification information obtained in step S142 and the number of characters (display volume) of the content of the notification.

Then, the controller 100 displays the content of the notification stored in the notification information obtained in step S142, in the information area allocated in step S144 (step S146). In addition, the controller 100 displays the home screen on the displayer 140 on the basis of the home screen information 162 obtained in step S140 (step S148). This will cause display elements such as operation mode buttons, text, and icons to be displayed on the displayer 140. In doing so, if the information area has been allocated, the controller 100 displays the home screen according to the allocated information area. For example, if an information area is allocated in the area where the operation mode button is displayed, the controller 100 displays the operation mode button in the area where the operation mode button is to be displayed, except the information area. This allows the operation mode button and the content of the notification to be displayed side by side on the home screen.

By executing the processing from step S100 to step S148, the controller 100 can display the display content of the home screen (for example, a display element such as the operation mode button) and the content of the notification, on the displayer 140.

Then, the controller 100 determines whether the operation mode button has been selected by the user (step S150). For example, when an operation to touch the area where the operation mode button is displayed is input via the operation acceptor 150, the controller 100 determines that the operation mode button has been selected.

When determining that the operation mode button has been selected, the controller 100 switches the operation mode to the operation mode corresponding to the selected operation mode button (if Yes in step S150, then step S152).

1.2.3 Selected Operation Mode Screen Display Processing

The selected operation mode screen display processing will be described with reference to FIG. 7. First, the controller 100 obtains the screen information corresponding to the operation mode of the image forming apparatus 10 from the screen information storage area 164 of the storage 160 (step S170).

Then, the controller 100 obtains the notification information based on the operation mode of the image forming apparatus 10 (step S172). For example, the controller 100 obtains the following notification information from the notification information storage area 166 of the storage 160.

(1) Notification information in which the corresponding operation mode matches the current operation mode (2) Notification information that is not associated with a specific operation mode Then, the controller 100 allocates an information area (step S174). Here, in step S174, the operation mode is the operation mode for operating a predetermined function provided by the image forming apparatus 10. Therefore, the controller 100 displays a screen for accepting instruction to change the settings of the function or to execute processing of the function, unlike the home screen that displays the operation mode buttons.

For example, when displaying a screen on the basis of the screen information obtained in step S170, the controller 100 allocates an area for displaying (arranging) the buttons and other elements for making settings, instead of the area for displaying the operation mode button. Therefore, when displaying a screen based on the screen information obtained in step S170, the controller 100 allocates an information area in a place different from the area where the buttons and other elements are displayed (arranged). For example, the controller 100 allocates an information area at a position above the area where buttons and other elements are displayed (arranged).

Then, the controller 100 displays the content of the notification stored in the notification information obtained in step S172 in the information area allocated in step S174 (step S176).

In addition, the controller 100 displays the screen of an operation mode on the displayer 140 on the basis of the screen information obtained in step S170 (step S178). For example, the controller 100 arranges display elements on the basis of layout information, or decorates display elements on the basis of color scheme information.

By executing the processing from step S170 to step S178, the controller 100 can display the display content of the operation mode (selected operation mode) corresponding to the function selected by the user (for example, a display element such as a button for making settings) and the content of the notification, on the displayer 140. In addition, in step S174, the controller 100 allocates an information area in accordance with the display screen corresponding to the selected operation mode, and thus can display the notification at an appropriate position.

Then, the controller 100 displays a home button for switching the operation mode to the home screen display mode, on the displayer 140 (step S180). In addition, when determining that the home button has been selected by the user, the controller 100 switches the operation mode of the image forming apparatus 10 to the home screen display mode (if Yes in step S182, then step S184).

1.3 Operation Example

Figure 8:
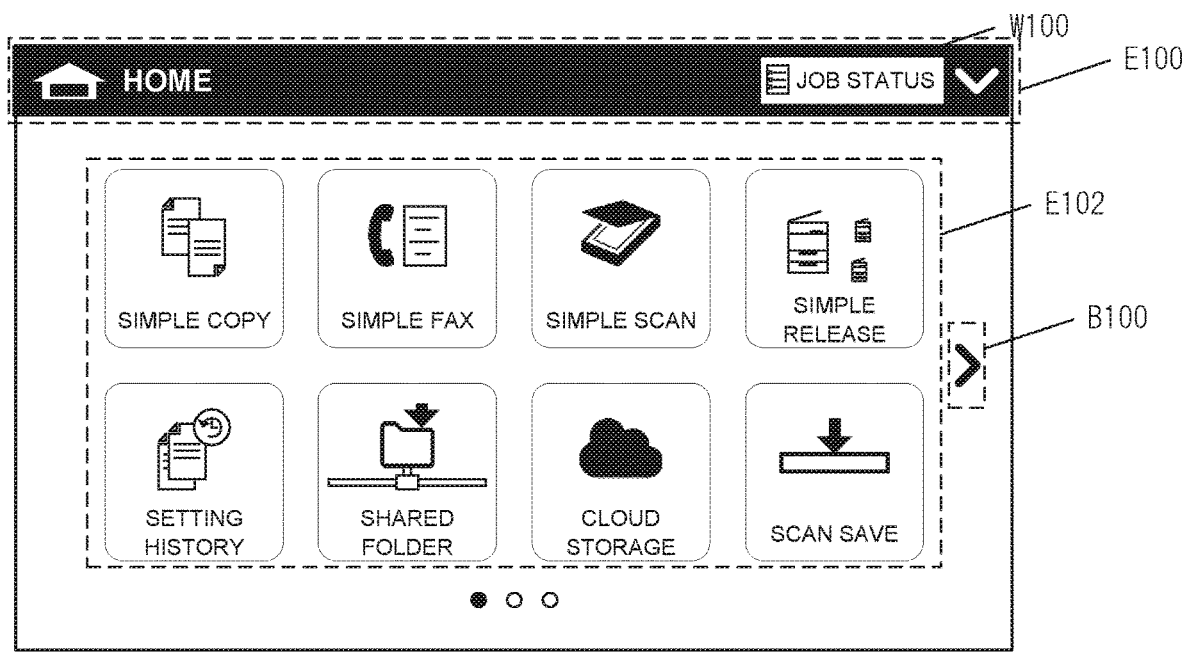
FIG. 8 is a diagram illustrating an example of operation in the first embodiment.

Next, an operation example in the present embodiment will be described with reference to FIGS. 8 to 10. FIG. 8 is a diagram illustrating a screen example of a home screen W100 displayed on the displayer 140. The home screen W100 includes a status area E100 that displays the current operation mode and state of the image forming apparatus 10, and an area E102 that displays the operation mode buttons.

Temporary information based on the state of the image forming apparatus 10 may be displayed in the status area E100. The information displayed in the status area E100 is, for example, the number and type of jobs that are scheduled to be executed and the content of jobs that have been completed.

In addition, if all the operation mode buttons cannot be fully displayed in the area E102, the operation mode buttons displayed in the area E102 can be switched. For example, a button B100 for switching the display of the operation mode buttons displayed on the displayer 140 may be included in the home screen W100.

Figure 9A:
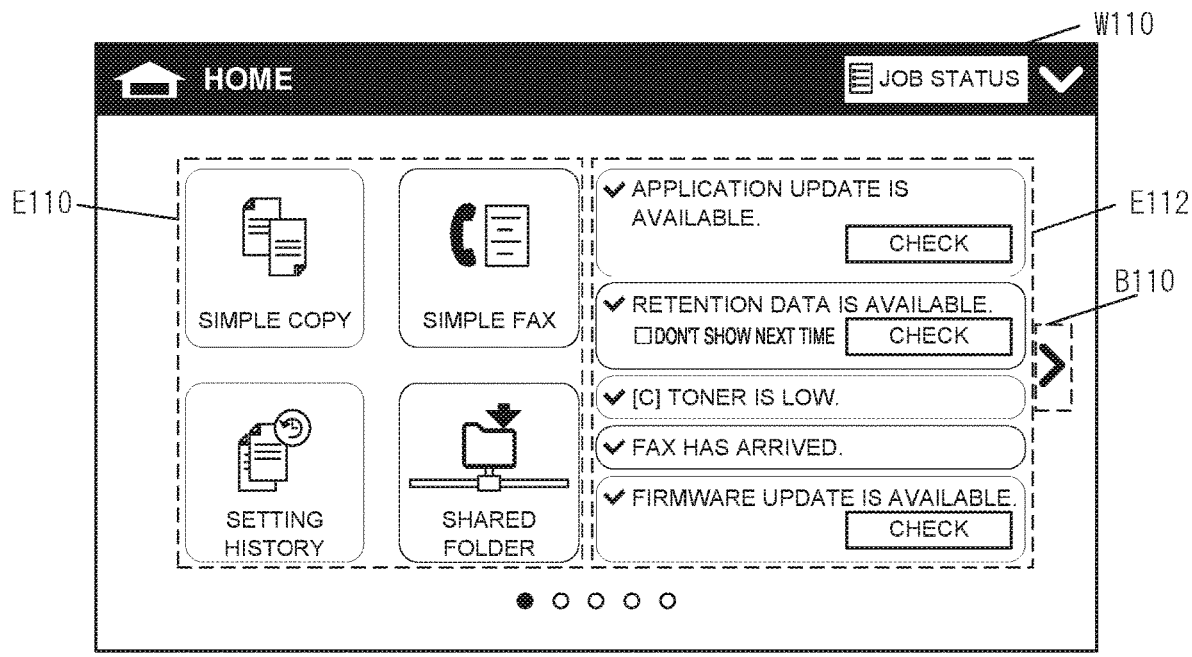
FIGS. 9A and 9B are diagrams illustrating an example of operation in the first embodiment.

FIG. 9A is a diagram illustrating a screen example of a home screen W110 displayed on the displayer 140 when the content of the notification is displayed. In the home screen W110, an information area E112 is allocated in addition to an area E110 for displaying the operation mode buttons. The information area E112 displays the content of all the notifications stored in the image forming apparatus 10.

If the content of all the notifications cannot be displayed on the home screen W110, the information area E112 can be made a scrollable area, and the content of the notifications may be displayed in accordance with the user's scrolling operation. In addition, the content of the notification displayed in the information area E112 may be switched.

Further, the number of operation mode buttons that can be displayed on the home screen W110 may be reduced by allocating the information area E112. For example, in the home screen W100 illustrated in FIG. 8, eight operation mode buttons are displayed in the area E102. On the other hand, in the home screen W110 illustrated in FIG. 9A, four operation mode buttons are displayed in the area E110. In this case, the operation mode buttons that are no longer displayed in area E110 may be displayed by a button B110 that is for switching the display of the operation mode buttons displayed in the area E110. In other words, the operation mode button displayed on the home screen may be switched on the basis of the user's operation.

Here, an operation mode button that is not displayed because the information area E112 is allocated is automatically determined by the image forming apparatus 10 (controller 100) in accordance with the display order of the operation mode buttons, for example. The home screen information 162 may store the priority of each function, and the operation mode button corresponding to a function with a high priority may be displayed preferentially even if the information area E112 is allocated. In this case, a user operation is required to display the operation mode button corresponding to a function with a lower priority.

Figure 9B:
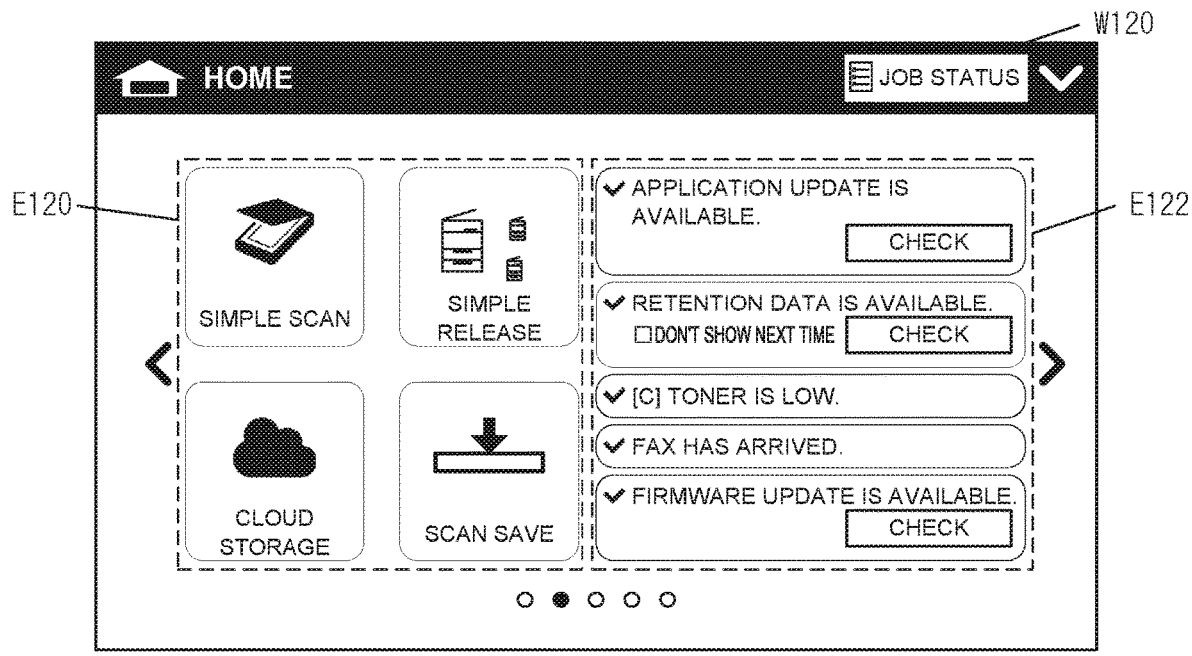

FIG. 9B is a screen example of a home screen W120 displayed on the displayer 140 when the button B110 for switching the display of the operation mode buttons in FIG. 9A is selected. In this manner, the page of the operation mode buttons displayed on the home screen is switched.

An information area E122 may remain allocated even when the page is switched, or may be released at the timing when the page is switched. In addition, the information area E122 does not have to be allocated for the second and subsequent pages, and may be smaller than the size of the first page.

Figure 10:
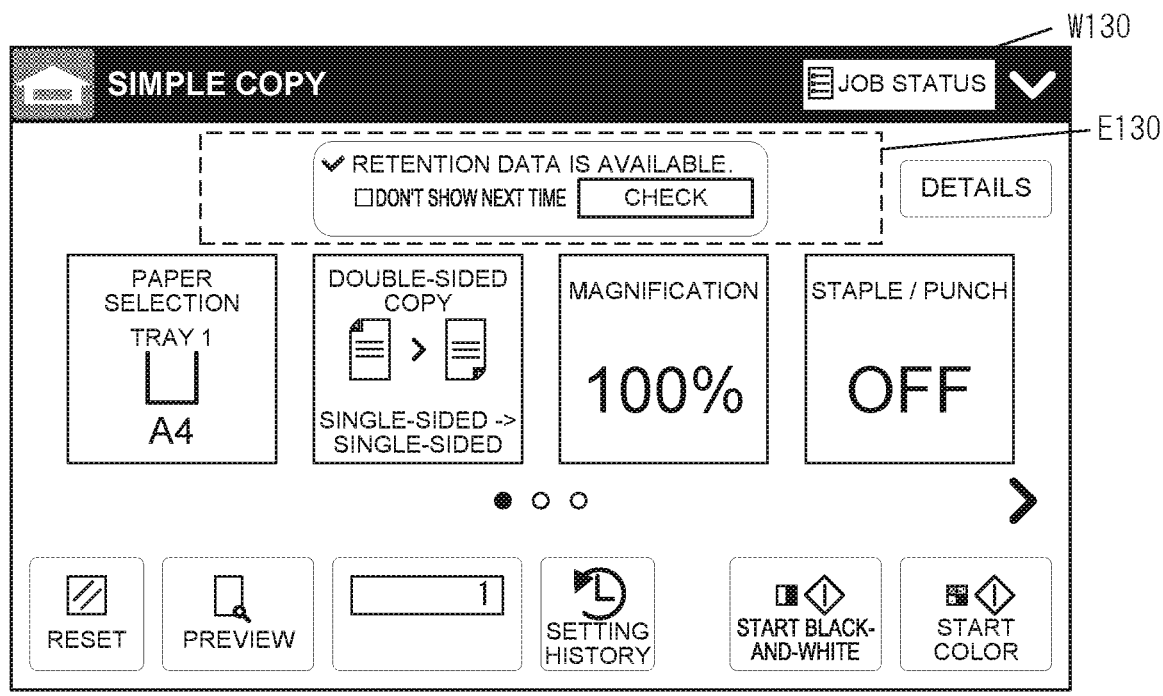
FIG. 10 is a diagram illustrating an example of operation in the first embodiment.

FIG. 10 is a diagram illustrating a screen example of a screen W130 displayed on the displayer 140 after the operation mode button is selected by the user. The screen W130 is the screen for the operation mode called simple copy mode. The user can make settings related to the function of simple copy via the screen W130.

In addition, as illustrated in FIG. 10, an information area E130 is allocated above the area where the buttons for making settings are displayed. In this way, the information area E130 is allocated so as not to impair the operation of setting the operation mode.

In the information area E130, the content of the notification corresponding to the simple copy mode is displayed. In this way, the screen corresponding to a specific operation mode continues to display only the content of notifications related to that operation mode, as compared to the home screen.

The display format of the content of the notification displayed in the information area E130 may be changed as appropriate depending on the number of pieces of content to be notified and the operation by the user. For example, when all the content of the notification corresponding to the operation mode cannot be displayed in the information area E130, the display format of the information area E130 and the content of the notification displayed in the information area E130 may be switched by the user's operation. For example, the information area E130 may be temporarily enlarged and displayed (superimposed on a button for making a setting of the operation mode, etc.) in response to a user operation (e.g., a touch operation or a pinch-out operation). In this case, the enlarged information area E130 may display the content of more notifications than the number of notifications that were displayed before the enlargement. In addition, the content of the notification may be divided into multiple pages, and a button for switching pages may be displayed in the information area E130. In this case, the content of the notification displayed in the information area E130 is switched in accordance with the user's operation on the button for switching pages.

The content of the notification displayed in the information area E130 may be automatically switched every time a certain amount of time elapses. Further, the information area E130 may be a scrollable area.

Furthermore, the information area E130 may not be allocated in the upper portion of the screen W130, and may be allocated in, for example, the right portion, the left portion, and the lower portion of the screen W130.

In this way, when the home screen is switched to the screen of the operation mode selected by the user, the content of the notification may be displayed at the same position on the home screen and the screen of the operation mode, or the content of the notification may be displayed in a different place. If the content of the notification is displayed in a different place from that on the home screen in the screen of the operation mode, the notification is displayed at a position that does not make the user's operation unacceptable in the screen of the operation mode.

In addition, when the same notification is displayed on the home screen and the screen of the operation mode selected by the user, the content of the notification may be displayed in the same display format by being displayed on a graphic of the same background color or shape, or by being displayed with the same icon. In this way, by displaying the same notification content in the same manner on the home screen and the screen after the transition, the user can be made aware that the same information is being displayed.

1.4 Variation of The Present Embodiment

Next, as a variation of the present embodiment, an example in which a priority is set for the content of the notification and the content of the notification is displayed in accordance with the priority will be described.

Figures 11A, 11B:
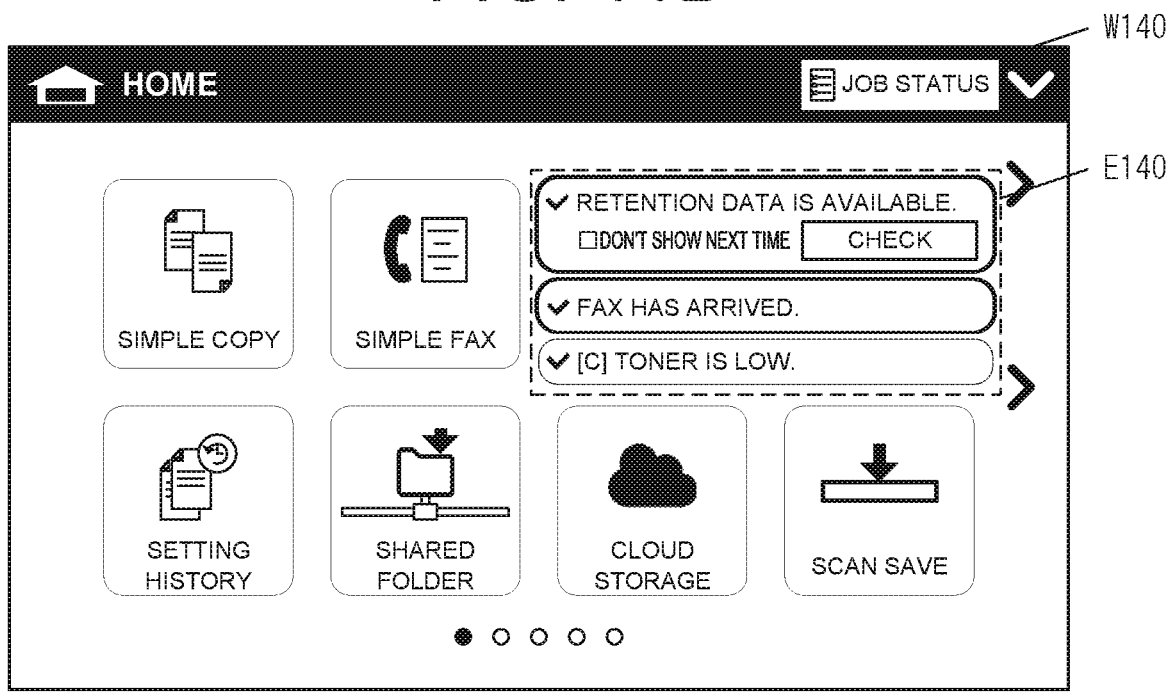
FIGS. 11A and 11B are a table and a diagram that illustrate an example of operation in the first embodiment.

First, an example of setting a display level for each type of content of the notification will be described. In this example, as illustrated in FIG. 11A, the storage 160 stores a table (display level table) that maps a type of content of the notification (e.g., "notification that there is no retention data") to a display level (e.g., "display (highlighted)").

As the display level, for example, one of "display (highlighted)," "display," or "no display" is stored. The display level is set by the administrator or the like of the image forming apparatus 10.

In addition, the controller 100 displays the content of the notification in accordance with the display level table, in step S146 of the home screen display processing and in step S176 of the selected operation mode screen display processing.

For example, the controller 100 controls the display of only the content of the notification corresponding to the type of notification for which the display level is set to "display (highlighted)" or "display". Further, the controller 100 may display the content of the notification corresponding to the type of notification for which the display level is set to "display (highlighted)" more prominently than the content of the notification corresponding to the type of notification for which the display level is set to "display". Furthermore, the controller 100 may preferentially display the content of the notification corresponding to the type of notification for which the display level is set to "display (highlighted)".

FIG. 11B is a diagram illustrating a screen example of a home screen W140 when the content of the notification is displayed on the displayer 140 on the basis of the display level table. In the home screen W140, an information area E140 is allocated and the content of the notification corresponding to the type of notification for which the display level is set to "display (highlighted)" or "display" is displayed.

In addition, depending on the display level, the content of the notification will be highlighted or the content of the notification will be sorted. As a result, the content of the notification corresponding to the type of notification set to "display (highlighted)" will be displayed in a manner that is easily visible to the user.

In this way, the administrator or the like of the image forming apparatus 10 can control the level of display of notification in accordance with the type of notification. For example, the administrator or the like of the image forming apparatus 10 can prominently display a notification that needs to be seen by users in particular.

Next, as another example, an example of setting a priority for each content of a notification will be described. In this example, as illustrated in FIG. 12A, the notification information includes a type (e.g., "information") and a priority (e.g., "20") in addition to the content of the notification and the corresponding operation mode.

The type is information that indicates the type of content of the notification, and for example, "error," "information," and "guidance" are stored. In addition, the priority is stored as a numerical value. In the example in FIG. 12A, a smaller number indicates a higher priority. The priority may be set by the administrator or the like of the image forming apparatus 10, may be set automatically corresponding to the type, or may be set automatically in accordance with the content of the notification.

In addition, the controller 100 displays the content of the notification in accordance with the type and priority, in step S146 of the home screen display processing and in step S176 of the selected operation mode screen display processing.

Figures 12A, 12B:
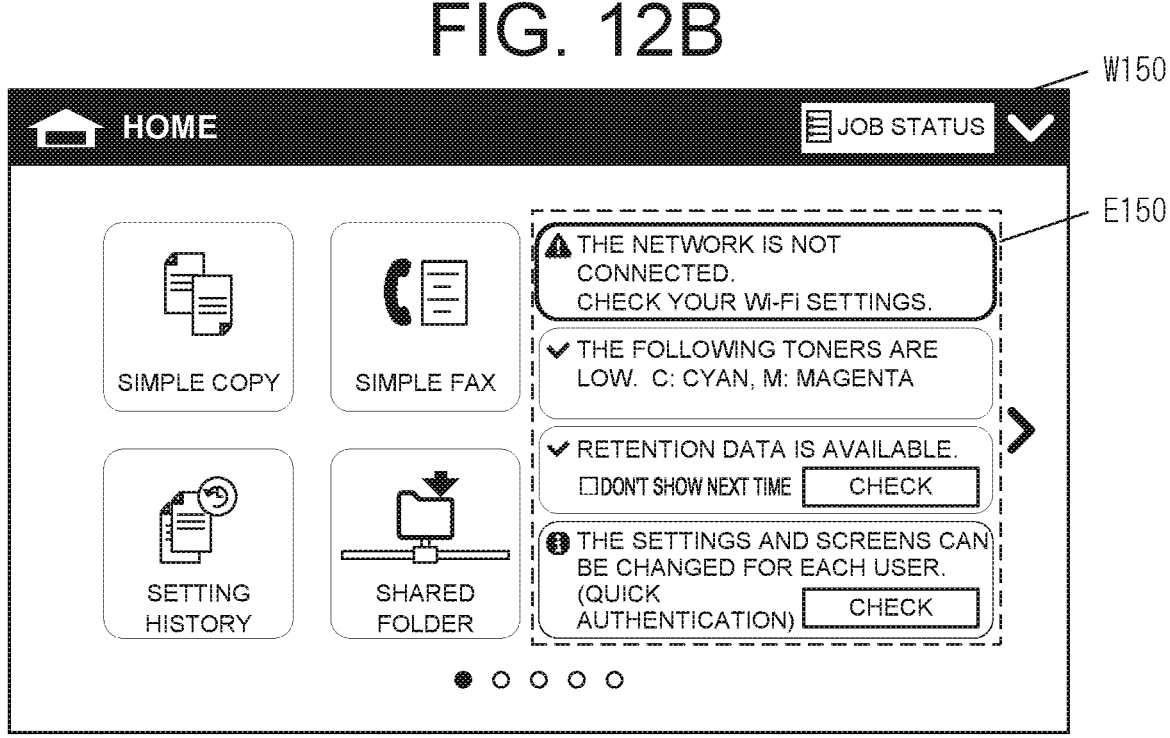
FIGS. 12A and 12B are a table and a diagram that illustrate an example of operation in the first embodiment.

FIG. 12B is a diagram illustrating a screen example of a home screen W150 in which the content of the notification is displayed on the displayer 140 on the basis of the display level table. In the home screen W150, an information area E150 is allocated and the content of the notification is displayed in accordance with the type and priority.

For example, the content of a notification with a higher priority is displayed more preferentially, or the content of a notification is displayed in a display format according to its type. In addition, the content of the notification may be sorted and displayed by type.

In the present embodiment, the information area is automatically allocated, but the information area may be allocated by other methods. For example, a widget that displays the content of the notification can be placed on the home screen of the image forming apparatus 10 or on the screen of a predetermined operation mode. In this case, the image forming apparatus 10 allocates the area where the widget displaying the content of the notification is placed as the information area. By configuring in this manner, the user can freely set the position and size of the content of the notification to be displayed.

As described above, according to the present embodiment, it is possible to display the content of the notification related to the displayed screen at an appropriate position on the home screen or the screen displayed when a predetermined function is used.

In particular, the home screen displays all the content of the notifications, but on the screen corresponding to a predetermined function, only the notifications related to that function are displayed, while other notifications are hidden. In this way, the image forming apparatus of the present embodiment can make the user pay attention only to the information of interest without giving unnecessary information. As a result, the user can clarify the necessary actions and procedures, and reduce the number of operations that result in malfunctions.

For example, when the copy function is used and the network function cannot be used, the image forming apparatus in the present embodiment hides the notification that the network function cannot be used. This prevents users from being misled into thinking that they need to take the network status into account in order to use the copy function, and reduces the possibility of work delays and erroneous operations.

In addition, since the content of a notification related to a predetermined function is displayed on the screen corresponding to that function, users can notice the notification when using the selected function, even if they overlook the content of the notification displayed on the home screen.

On the other hand, the screen corresponding to a predetermined function does not display the content of notifications that are not related to that function. Therefore, when using a predetermined function, the user no longer needs to determine whether the content of the notification is related to the function to be used.

In this manner, the image forming apparatus can display the content of a notification appropriately in accordance with the screen displayed on the displayer.

2. Second Embodiment

Next, a second embodiment will be described. The second embodiment differs from the first embodiment in that the second embodiment displays the content of a notification in accordance with the operation mode and user. In the present embodiment, FIG. 2 of the first embodiment is replaced with FIG. 13, and FIG. 5 of the first embodiment is replaced with FIG. 16, respectively. The same functional part and processing are denoted by the identical numerical number and the explanations thereof are omitted.

2.1 Functional Configuration

Figure 13:
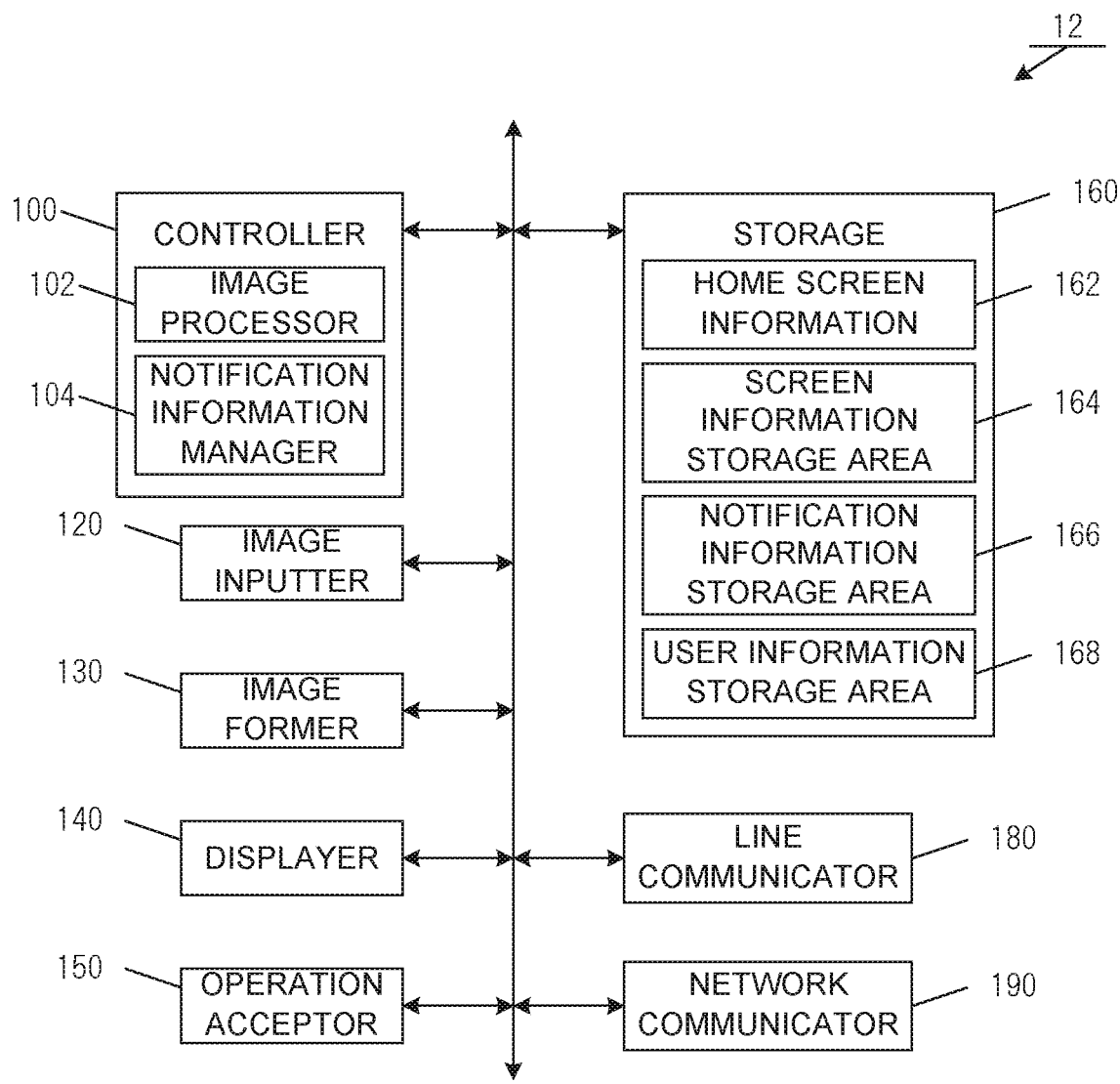
FIG. 13 is a diagram for explaining a functional configuration of an image forming apparatus in a second embodiment.

With reference to FIG. 13, a functional configuration of an image forming apparatus 12 in the present embodiment will be described. Unlike the image forming apparatus 10 in the first embodiment, the image forming apparatus 12 further allocates a user information storage area 168 in the storage 160.

The user information storage area 168 is an area where the information of the user who uses the image forming apparatus 12 (user information) is stored. As illustrated in FIG. 14, the user information stores, for example, a login name (e.g., "userA") that is information to identify the user, a password (e.g., "abc123"), a user name (e.g., "John Smith"), and a user type (e.g., "general user").

In the present embodiment, it is assumed that the user type stores either "general user" or "administrator" information. For the user type, information other than "general user" and "administrator" may be stored.

Next, the notification information in the present embodiment will be described with reference to FIG. 15. The notification information in the present embodiment differs from the notification information in the first embodiment, and a target user (e.g., "administrator") is further stored. In the present embodiment, either the user type or the login name is stored in the target user.

2.2 Flow of Processing

2.2.1 Main Processing

Figure 16:
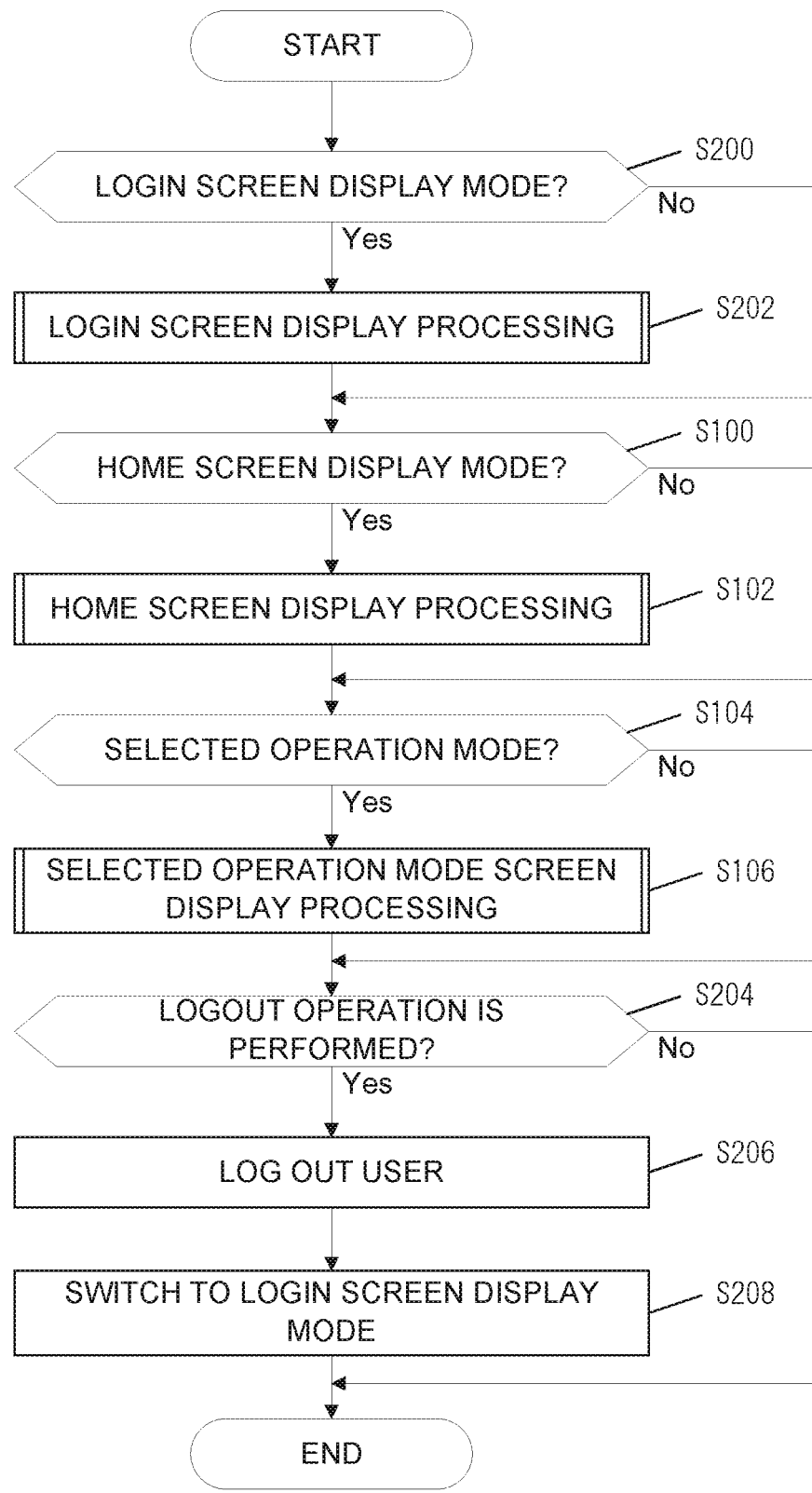
FIG. 16 is a flow diagram for explaining a flow of main processing by the image forming apparatus in the second embodiment.
Figure 17:
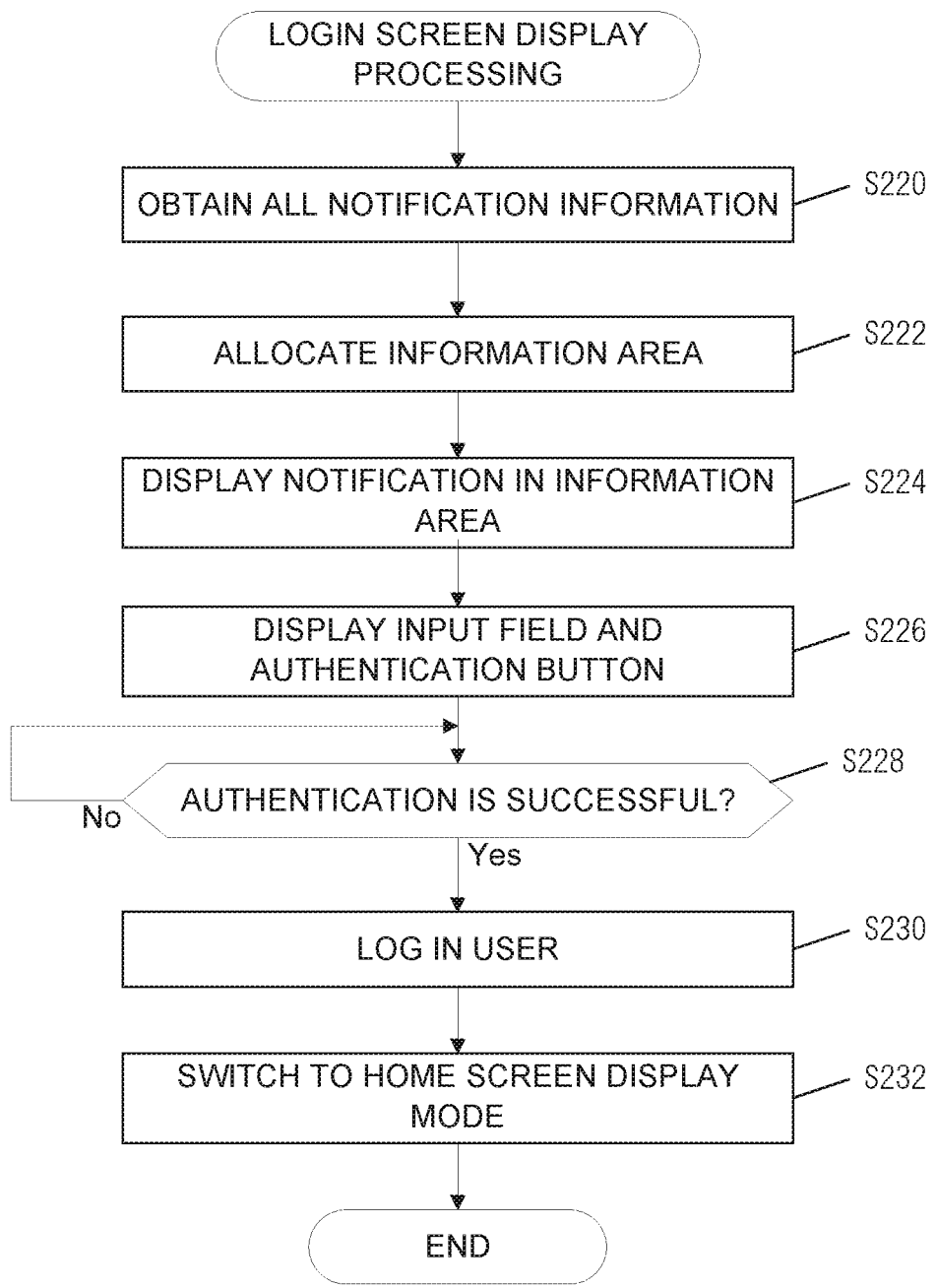
FIG. 17 is a flow diagram for explaining a flow of login screen display processing in the second embodiment.

The main processing executed by the controller 100 of the image forming apparatus 12 in the present embodiment will be described with reference to FIGS. 16 and 17. The present embodiment is described assuming that when the image forming apparatus 12 returns from the sleep mode or low power mode, the controller 100 switches the operation mode to the login screen display mode which is the mode to display the login screen.

First, the main processing illustrated in FIG. 16 will be described. In the present embodiment, the controller 100 determines whether the operation mode is the login screen display mode (step S200). When determining that the operation mode is the login screen display mode, the controller 100 executes login screen display processing that displays the login screen on the displayer 140 (if Yes in step S200, then step S202). The login screen display processing will be described below.

In addition, when the logout operation is performed by the user, the controller 100 executes the process of logging out the user and also switches the operation mode to the login screen display mode (if Yes in step S204, then step S206, and then step S208).

2.2.2 Login Screen Display Processing

The login screen display processing will be described with reference to FIG. 17. First, the controller 100 reads the notification information storage area 166 of the storage 160, thereby obtaining all the notification information stored in the notification information storage area 166 (step S220).

Next, the controller 100 allocates an information area in the display area of the displayer 140 (step S222). In step S222, the operation mode is the login screen display mode which displays the login screen. Therefore, the controller 100 allocates an area that displays an input field for entering information used for authentication (e.g., a login name and a password) instead of the area for displaying the operation mode button and the area for displaying the button for accepting the instruction to change the function setting. Accordingly, the controller 100 allocates an information area in a different place from the area where the input field for entering information used for authentication is displayed. For example, the controller 100 allocates an area for displaying the input field on the left side of the display area of the displayer 140, and allocates an information area on the right side of the display area of the displayer 140. This allows the controller 100 to display the input fields and the content of the notification side by side on the right and left.

Then, the controller 100 displays the content of the notification stored in the notification information obtained in step S220 in the information area allocated in step S222 (step S224).

Next, the controller 100 displays an input field for entering information used for authentication (e.g., a login name and a password) in the display area of the displayer 140, and an authentication button used for executing authentication (step S226).

Subsequently, when the authentication button is selected by the user, the controller 100 performs authentication on the basis of the information entered in the input field and determines whether the authentication is successful (step S228). For example, the controller 100 determines whether the login name and password entered by the user match any of the user information stored in the user information storage area 168. When determining that the login name and password entered by the user match any of the user information stored in the user information storage area 168, the controller 100 determines that the authentication is successful.

Then, the controller 100 executes the processing to log in the authenticated user (if Yes in step S228, then step S230). Further, the controller 100 switches the operation mode to the home screen display mode (step S232).

2.2.3 Home Screen Display Processing and Selected Operation Mode Screen Display Processing In the present embodiment, in step S142 of the home screen display processing described in the first embodiment, processing of obtaining notification information related to the logged-in user among the pieces of notification information stored in the notification information storage area 166 is executed.

The notification information related to the logged-in user is the following notification information.

(1) When the logged-in user's user type is administrator: all notification information (2) When the logged-in user's user type is general user: notification information with the user type of "general user" and notification information in which the same login name as the login name of the logged-in user is stored In addition, in the present embodiment, in step S172 of the selected operation mode screen display processing described in the first embodiment, notification information that is related to the logged-in user and is based on the operation mode is obtained from the notification information stored in the notification information storage area 166.

By executing the processing described above, the content of notifications related to the user will be displayed on the home screen and the screen of the operation mode selected by the user.

2.3 Operation Example

Figure 18:
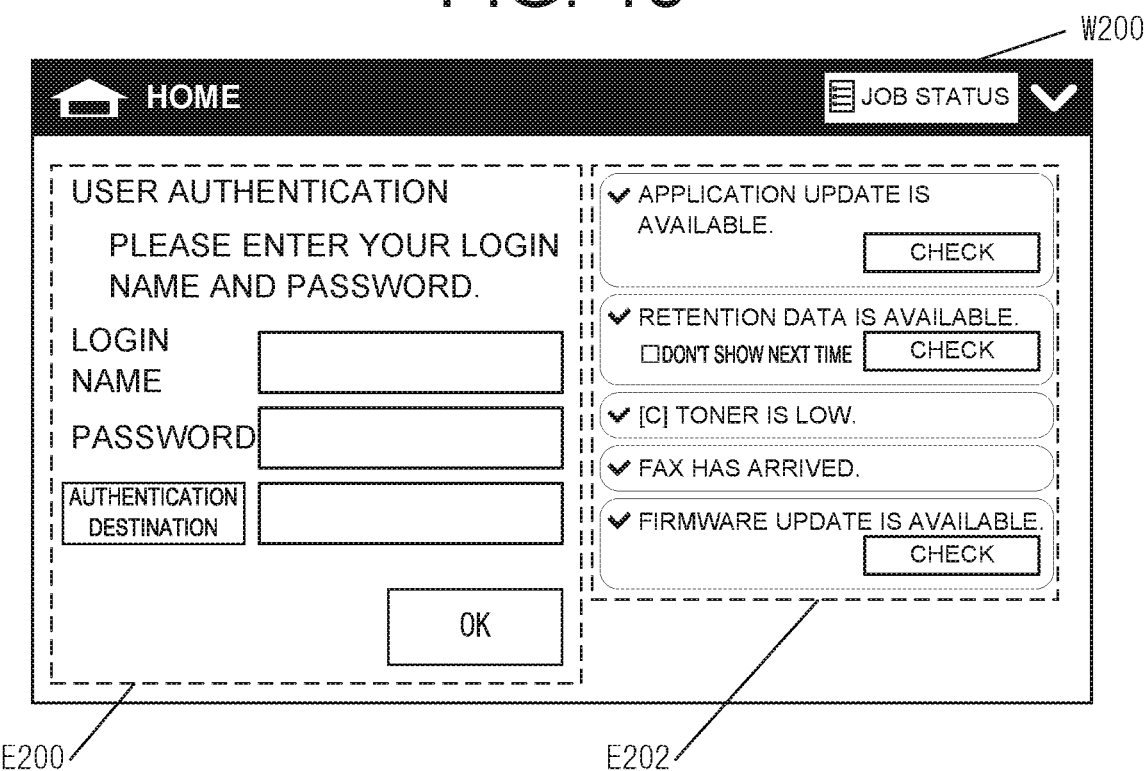
FIG. 18 is a diagram illustrating an example of operation in the second embodiment.

Next, an operation example in the present embodiment will be described with reference to FIGS. 18 and 19. FIG. 18 is a diagram illustrating a screen example of a login screen W200 displayed on the displayer 140. The login screen W200 includes an area E200 where the input fields and the authentication button are displayed and an information area E202. This allows the user to check the content of the notification when performing the authentication operation.

Figure 19A:
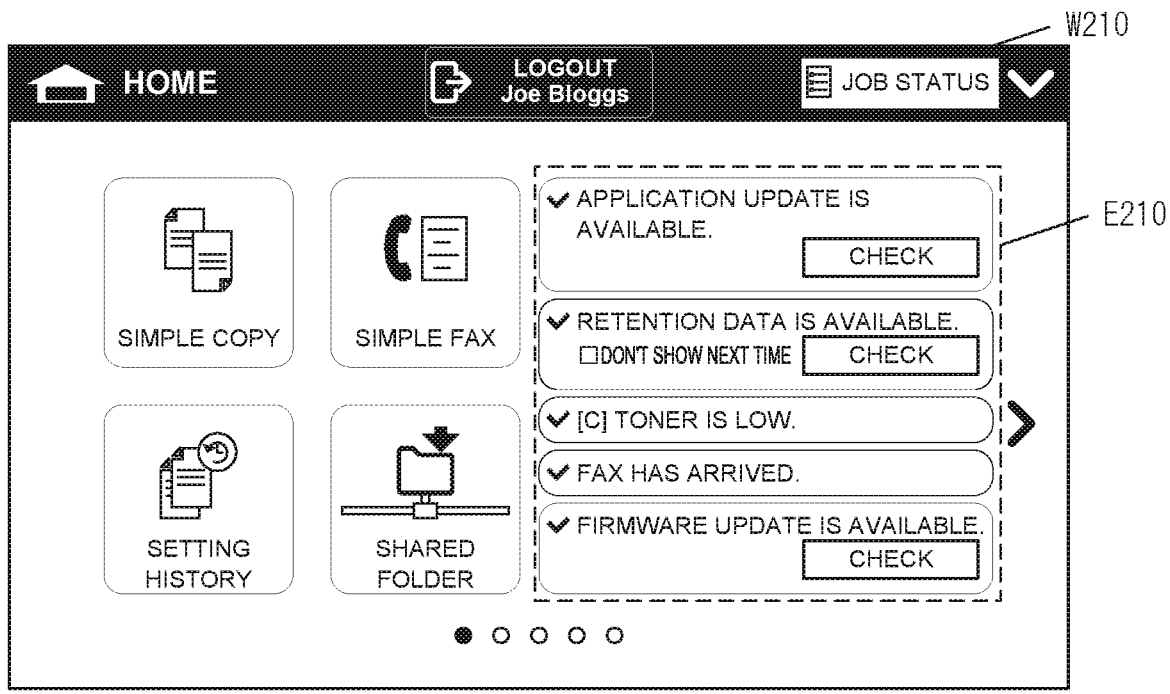
FIGS. 19A and 19B are diagrams illustrating an example of operation in the second embodiment.
Figure 19B:
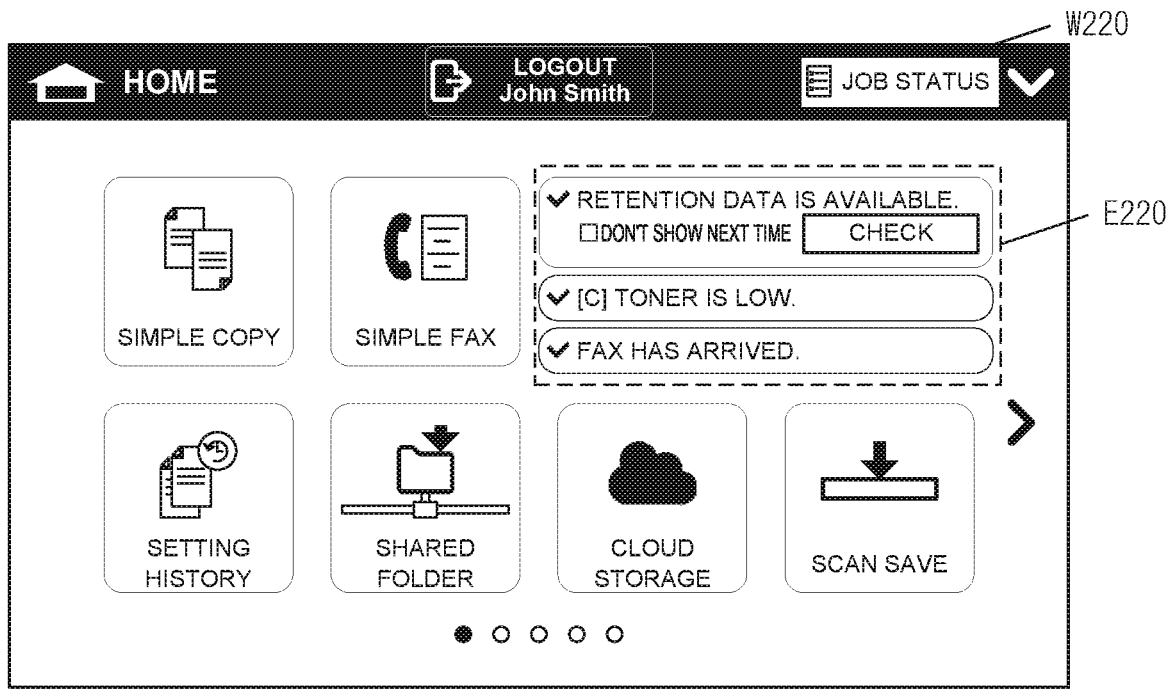

FIGS. 19A and 19B are diagrams illustrating a screen example of a home screen displayed on the displayer 140. FIG. 19A is a display example of a home screen W210 displayed when a user whose user type is "administrator" logs in. In the home screen W210, an information area E210 is allocated. On the other hand, FIG. 19B is a display example of a home screen W220 displayed when a user whose user type is "general user" logs in. In the home screen W220, an information area E220 is allocated.

Here, the information area E210 displays the content of all the notifications stored in the image forming apparatus 12. Therefore, the administrator of the image forming apparatus 12 will be able to know all the content that is notified to the user. On the other hand, the information area E220 displays only the content of notifications related to the authenticated user, out of the content of all the notifications stored in the image forming apparatus 12. Therefore, the general user of the image forming apparatus 12 will be able to grasp only the content related to the user.

The image forming apparatus 12 may be able to enable or disable the user authentication function. When the user authentication function is enabled, the image forming apparatus 12 may execute the processing described in the second embodiment, and when the user authentication function is disabled, the image forming apparatus 12 may execute the processing described in the first embodiment.

In addition, the present embodiment has been described assuming that the image forming apparatus 12 authenticates the user, but the user authentication may be performed by an apparatus connected to the image forming apparatus 12 (for example, an authentication server).

According to the image forming apparatus of the present embodiment, since the content of the notification is displayed on the login screen, the user can understand the state of the image forming apparatus before logging in. In addition, the user can also perform appropriate operations on the basis of the content of the notification. For example, when the paper is out, the user can replenish the paper and then log in. Further, when the network is not in good condition, the user can report it to the administrator of the image forming apparatus.

Furthermore, according to the image forming apparatus of the present embodiment, when the display is switched from the login screen to the home screen, only the content of notifications corresponding to the logged-in user is displayed, and the content of notifications not related to the user is hidden. Consequently, the image forming apparatus of the present embodiment can make the user pay attention only to the information of interest without giving unnecessary information. As a result, the image forming apparatus of the present embodiment can clarify the necessary actions and procedures for the user, and reduce the number of operations that result in malfunctions.

For example, when application or firmware update information is displayed on the login screen, if the logged-in user is not an administrator, the application or other update information will not be displayed. In this way, the image forming apparatus of the present embodiment prevents the user from misunderstanding that the function of the image forming apparatus cannot be used unless the application or the like is updated, and can reduce the possibility of work delays and erroneous operations.

3. Third Embodiment

Next, a third embodiment will be described. The third embodiment is an embodiment in which the information area is allocated in a place where the user's operation cannot be accepted (blocked). The present embodiment can be applied to any of the first embodiment and the second embodiment.

In the present embodiment, when a predetermined function is not available, an information area is allocated on the display element selected to use the function. In addition, the content of the notification including the cause of not being able to use the function and the remedy is displayed in the information area.

Specifically, in step S144 of the home screen display processing, the controller 100 determines whether the content of the notification stored in the notification information obtained in step S142 indicates that a predetermined function is not available. Then, if the content of the notification indicates that a predetermined function is not available, the controller 100 allocates an information area so that the information area overlaps the place where the display element selected to use the predetermined function is displayed. Further, in step S146, the controller 100 displays the content of the notification indicating that the predetermined function is not available, in the information area allocated in step S144.

The same processing as described above is also performed by the controller 100 in step S174 to step S176 of the selected operation mode screen display processing.

Figure 20A:
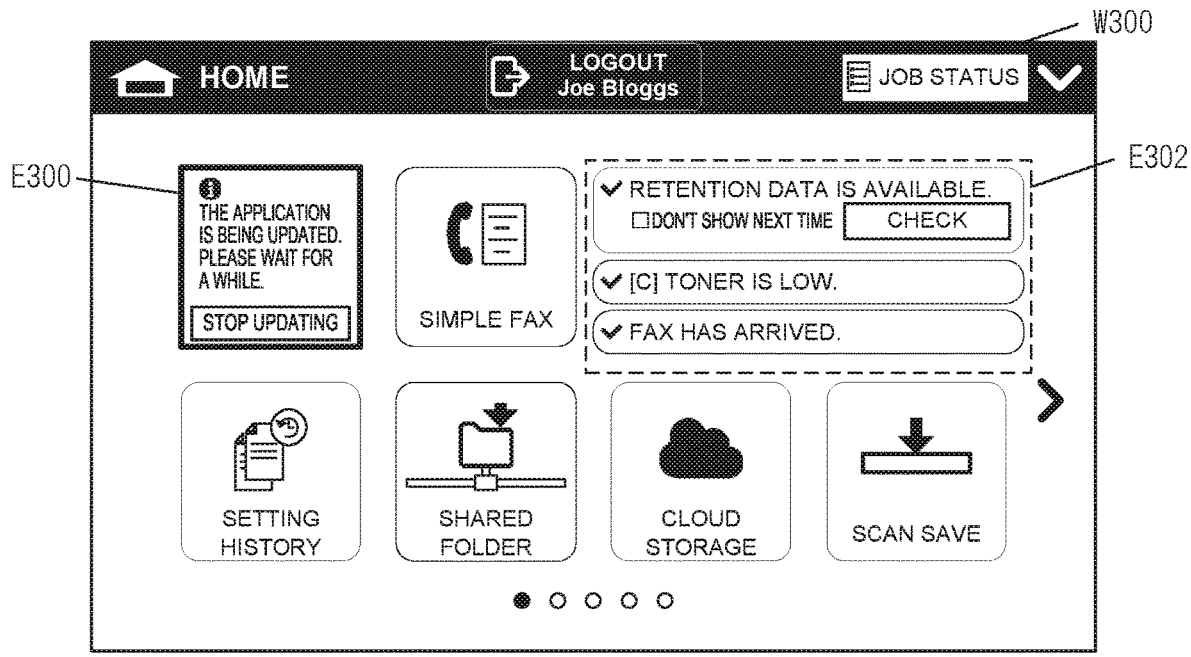
FIGS. 20A and 20B are diagrams illustrating an example of operation in a third embodiment.

Next, an example in the present embodiment will be described with reference to FIGS. 20 and 21. FIG. 20A is a diagram illustrating a screen example of a home screen W300 displayed on the displayer 140 when an information area E300 (widget that displays the content of the notification) is allocated at a position overlapping an operation mode button.

For example, when the simple copy function is not available (for example, when a software update is running or when the paper is out), an information area is allocated on the simple copy operation mode button. This makes it impossible for the user to select the simple copy operation mode button. As a result, the image forming apparatus 10 or 12 will not be able to shift to the mode of using the simple copy function.

As illustrated in FIG. 20A, more than one information area may be allocated. For example, apart from the information area E300 allocated on the operation mode button, an information area E302 may be allocated at a position that does not overlap with the operation mode button. In this case, the information area E302 displays the content of the notification that does not require the user's operation to be unacceptable.

In addition, the image forming apparatus 12 may display the content of the notification at a position that does not make the user's operation unacceptable on the home screen, and may display the content of the notification at a position that cannot accept the user's operation on the screen of the operation mode selected by the user.

Figure 20B:
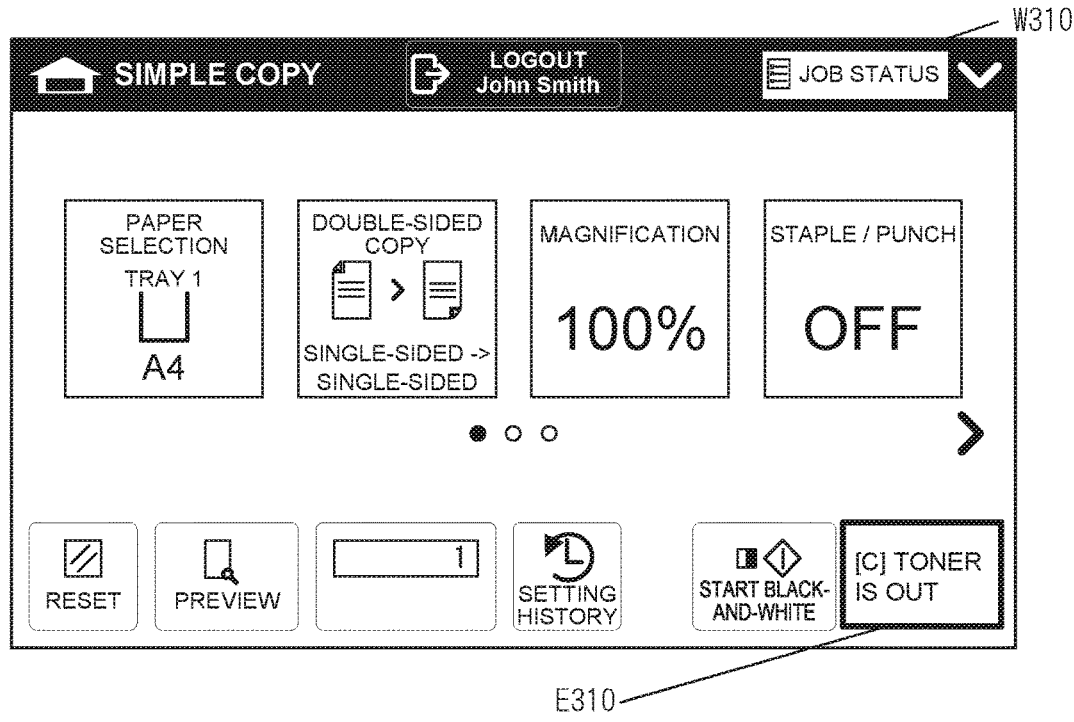

For example, when the cyan toner is out, the button for using the copy function (for example, the simple copy operation mode button) is displayed normally on the home screen, and a notification that the cyan toner is out is displayed at a different position from the button. On the other hand, as illustrated in FIG. 20B, in a screen W310 corresponding to the simple copy operation mode displayed on the displayer 140, an information area E310 is allocated on the color copy start button. This prevents the user from performing the color copy function. In addition, the user can also know that the cyan toner is out by checking the notification on the start button.

Figure 21A:
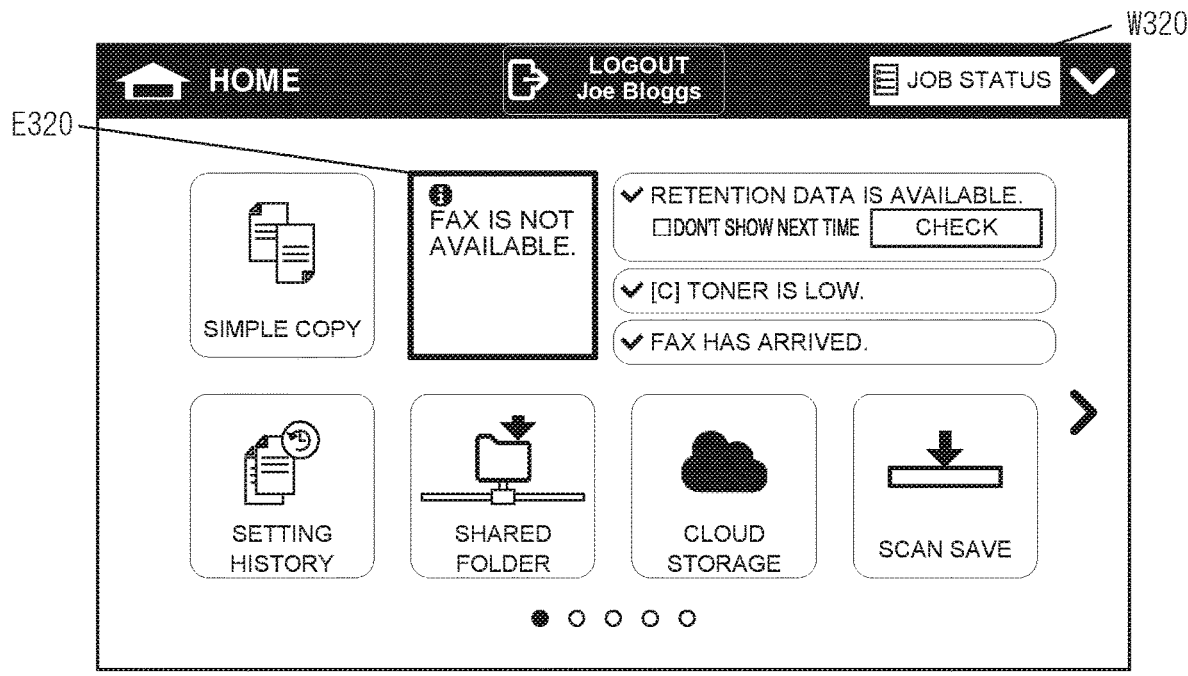
FIGS. 21A and 21B are diagrams illustrating an example of operation in the third embodiment.

FIG. 21A is a screen examples illustrating a home screen W320 displayed on the displayer 140 when a fax is received in the image forming apparatus 10 or the image forming apparatus 12 in which a fax cannot be newly transmitted unless a predetermined operation is performed when the fax is received. As illustrated in FIG. 21A, on the home screen W320, an information area E320 is allocated on the operation mode button for transmitting a fax. In this way, the user who uses the image forming apparatus 10 or the image forming apparatus 12 cannot transmit a new fax unless a predetermined operation such as an operation for receiving a fax is performed.

Figure 21B:
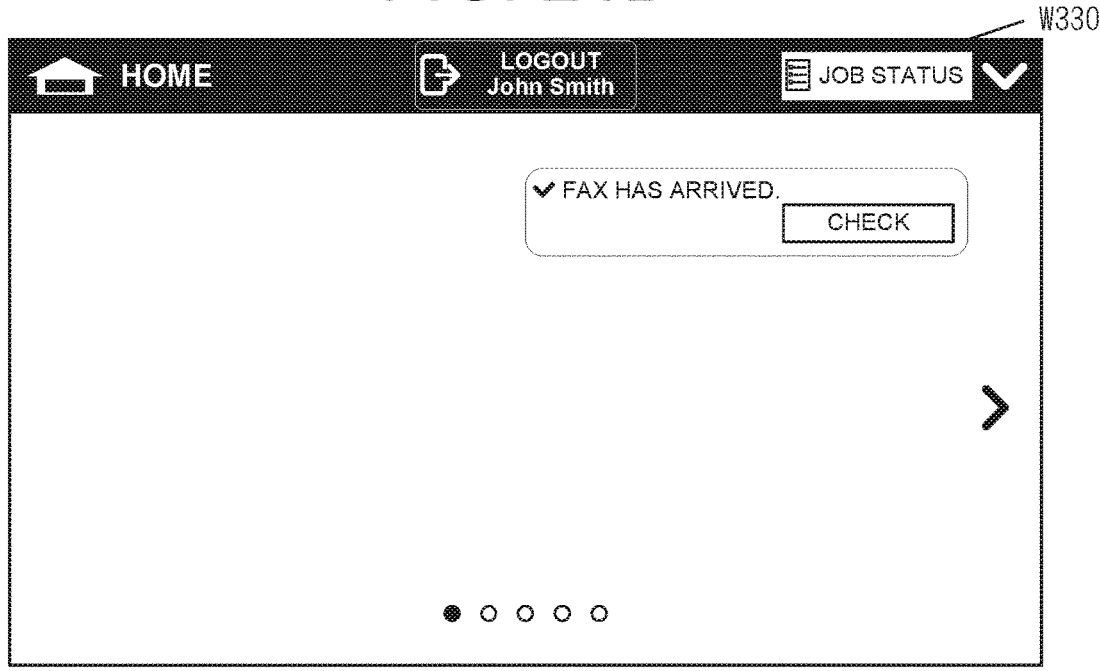

In addition, in the image forming apparatus 10 or the image forming apparatus 12 in which a fax cannot be newly transmitted unless a predetermined operation is performed when a fax is received, an information area may be allocated on the entire home screen when a fax is received. In this case, the home screen W330 such as that illustrated in FIG. 21B is displayed as the home screen displayed on the displayer 140. In this way, the user who uses the image forming apparatus 12 also cannot use functions other than fax transmission. As described above, the image forming apparatus 10 or the image forming apparatus 12 may make the user unable to use any function until a predetermined operation is performed, thereby executing processing of making the user check the content of the notification.

An information area may be allocated on the basis of the content of the notification for a specific user. For example, in the image forming apparatus 12 in which a fax cannot be newly transmitted unless a predetermined operation is performed when a fax is received, the home screen W320 in FIG. 21A or the home screen W330 in FIG. 21B may be displayed as the home screen of the user who has received the fax. On the other hand, a normal home screen, i.e., a home screen without an information area on the operation mode button for transmitting a fax, may be displayed as the home screen for the user who has not received a fax.

In addition, when the login screen is displayed, the content of the notification may be displayed at a position where the user's login operation is intentionally unacceptable, depending on the content of the notification.

According to the present embodiment, it is possible to explicitly indicate the causal relation between the state of the image forming apparatus or the input status from the outside and the operation the user is about to perform.

4. Fourth Embodiment

Next, a fourth embodiment will be described. The fourth embodiment is an embodiment in which an operation mode and a user related to the content of a notification are determined by using a machine learning method. The present embodiment can be applied to any of the first embodiment to the third embodiment.

In the present embodiment, only the content of a notification is stored as the notification information. Alternatively, in the present embodiment, the storage 160 further stores a learned model that has learned the relation between the content of a notification and a corresponding operation mode.

In addition, in the present embodiment, in step S172 of the selected operation mode screen display processing, the controller 100 obtains all the content of the notifications stored in the notification information storage area 166.

Further, in step S176, the controller 100 determines the corresponding operation mode for each content of the notification with the use of the learned model, and displays, in the information area, the content of the notification in which the determined corresponding operation mode matches the current operation mode.

In this way, the controller 100 can determine the operation mode corresponding to the content of the notification (corresponding operation mode) with the use of the learned model. In the same way, the controller 100 may determine the user type corresponding to the content of the notification. In this case, the storage 160 stores the learned model in which the relation between the content of the notification and the user type is learned (for example, a learned model in which the content of the notification and whether the content of the notification is a notification for a general user are learned). In addition, when displaying the content of the notification, the controller 100 determines whether the content of the notification is for a general user with the use of the learned model, and determines whether the content of the notification is related to the logged-in user.

In this way, by using a machine learning method to determine the operation mode or the like corresponding to the content of the notification, there is no need to prepare in advance a table that maps the content of a notification to a corresponding operation mode. In addition, even when the administrator or the like adds the content of an original notification, it is not necessary to specify an operation mode.

5. Variation

The present invention is not limited to the above-described embodiments, and various modifications can be made. That is, implementations obtained by combining techniques appropriately changed without departing from the gist of the present invention are also included in the technical scope of the present invention.

In addition, although some of the above-described embodiments are described separately for convenience of explanation, it is needless to say that it is possible to combine and implement the embodiments within a technically possible range.

Further, the program to be operated on each of the devices in the embodiments is a program which controls the CPU or the like (a program which makes a computer work) so as to implement the functions of the above-described embodiments. Moreover, the information handled by these devices is temporarily stored in a temporary storage device (for example, a RAM) at the time of processing, and then stored in various storage devices such as a ROM (Read Only Memory) and an HDD, and is read, corrected, and written by the CPU as needed.

Here, examples of a storage medium for storing the program may include a semiconductor medium (such as a ROM and a non-volatile memory card), an optical storage medium/magneto-optical storage medium (such as a DVD (Digital Versatile Disc), an MO (Magneto Optical Disc), an MD (Mini Disc), a CD (Compact Disc), and a BD (Blu-ray Disc (registered trademark)), and a magnetic storage medium (such as a magnetic tape and a flexible disk). Further, not only are the functions of the above-described embodiments implemented by execution of the loaded program, but the functions of the present invention may also be implemented by processing performed in cooperation with an operating system or other application programs or the like, on the basis of the instructions of the program.

Furthermore, if the program is to be distributed to the market, the program may be stored in a portable recording medium for distribution, or transferred to a server computer connected via a network such as the Internet. In this case, a storage device of the server computer is also included in the present invention as a matter of course.

While there have been described what are at present considered to be certain embodiments of the invention, it will be understood that various modifications may be made thereto, and it is intended that the appended claim cover all such modifications as fall within the true spirit and scope of the invention.

What is claimed is:

1. An image forming apparatus comprising:
   a displayer that displays a display screen corresponding to a mode;
   an obtainer that obtains content of a notification corresponding to the mode; and
   a controller that sets a whole display area on the display screen as a first area for displaying content of the mode when the content of the notification is not to be displayed on the display screen, and divides the display area into the first area and a second area for displaying the content of the mode in the first area and the content of the notification in the second area when the content of the notification is to be displayed on the display screen.

2. The image forming apparatus according to claim 1, wherein the controller displays the content of the notification in place of some of the content of the mode, and controls the display of some of the content of the mode on a basis of an operation of a user.

3. The image forming apparatus according to claim 1, wherein the mode includes a mode of displaying a home screen and a mode of displaying a screen of an operation mode corresponding to a function selected from the home screen.

4. The image forming apparatus according to claim 3, wherein the controller displays at least some of the content of the notification that is displayed in the mode of displaying the home screen in the mode of displaying the screen of the operation mode.

5. The image forming apparatus according to claim 1, wherein the controller authenticates a user and displays the content of the notification related to the authenticated user in the second display area out of the content of the notification that is obtained.

6. The image forming apparatus according to claim 5, wherein when controlling a display of a screen for authenticating the user, the controller obtains all the content of the notification and controls a display of some or all of the content of the notification that is obtained.

7. The image forming apparatus according to claim 1, wherein the controller displays the content of the notification on top of the content of the mode.

8. A control method for an image forming apparatus including a displayer that displays a display screen corresponding to a mode, the control method comprising:
  obtaining content of a notification corresponding to the mode;
  setting a whole display area on the display screen as a first area for displaying content of the mode when the content of the notification is not to be displayed on the display screen; and
  dividing the display area into the first area and a second area for displaying the content of the mode in the first area and the content of the notification in the second area when the content of the notification is to be displayed on the display screen.

* * * * *